United States Patent
Homchaudhuri et al.

(10) Patent No.: US 9,326,230 B2
(45) Date of Patent: Apr. 26, 2016

(54) MULTIDIMENSIONAL ALGORITHM FOR ROAMING

(71) Applicant: QUALCOMM Incorporated, San Diego, CA (US)

(72) Inventors: Sandip Homchaudhuri, San Jose, CA (US); Shu Du, Milpitas, CA (US); Sumeet Kumar, San Jose, CA (US); Sohani Ganesh Rao, San Jose, CA (US); Paul Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/048,464

(22) Filed: Oct. 8, 2013

(65) Prior Publication Data

US 2015/0098392 A1     Apr. 9, 2015

(51) Int. Cl.
*H04W 4/00* (2009.01)
*H04W 48/20* (2009.01)
*H04W 84/12* (2009.01)

(52) U.S. Cl.
CPC .............. *H04W 48/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,844,266 B2 | 11/2010 | Jeyaseelan et al. | |
| 8,427,942 B2 | 4/2013 | Kim et al. | |
| 2003/0139197 A1 | 7/2003 | Kostic et al. | |
| 2004/0039817 A1* | 2/2004 | Lee et al. | 709/225 |
| 2008/0014934 A1* | 1/2008 | Balasubramanian et al. | 455/434 |
| 2009/0010226 A1 | 1/2009 | Nishimura et al. | |
| 2010/0309815 A1 | 12/2010 | Yepez et al. | |
| 2011/0205910 A1* | 8/2011 | Soomro et al. | 370/252 |
| 2011/0216692 A1* | 9/2011 | Lundsgaard et al. | 370/328 |
| 2012/0063340 A1 | 3/2012 | Waters et al. | |

FOREIGN PATENT DOCUMENTS

| | | |
|---|---|---|
| GB | 2468469 A | 9/2010 |
| JP | 2011199447 A | 10/2011 |

OTHER PUBLICATIONS

ISA/EPO, International Search Report and Written Opinion of the International Searching Authority, Int'l App. No. PCT/US2014/058003, Jan. 21, 2015, European Patent Office, Rijswijk, NL, 12 pgs.

* cited by examiner

*Primary Examiner* — Frank Duong
(74) *Attorney, Agent, or Firm* — Holland & Hart LLP

(57) ABSTRACT

Methods, devices, and apparatuses are described for wireless communications using a multidimensional algorithm for roaming. In one aspect, an initial set of candidate access points (APs) is produced by a station using a roaming scan. The initial set may be identified based at least in part on an initial metric (e.g., beacon signal strength). A probe signal may be transmitted by the station to at least one of the candidate APs in the initial set and information may be received in response to the probe signals. The station may then identify a reduced set from the initial set based at least in part on the received information, where the reduced set is used to select a target AP. At least one additional metric may be identified and the probe signal may be configured to obtain information corresponding to the additional metrics. This information may be used by the station to select the candidate APs in the reduced set.

29 Claims, 16 Drawing Sheets

MULTIDIMENSIONAL ALGORITHM FOR ROAMING

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communication network may include a number of network devices such as access points (APs) that can support communication for a number of wireless devices. A wireless device may communicate with a network device bi-directionally. For example, in a wireless local area network (WLAN), a wireless device (e.g., a station or STA) may communicate with an AP via downlink and uplink. The downlink (or forward link) refers to the communication link from the AP to the STA, and the uplink (or reverse link) refers to the communication link from the STA to the AP.

As WLANs or Wi-Fi networks become more widespread, roaming is becoming an increasingly important area for wireless communications. In the past, a typical use-case scenario involved a corporate or enterprise setting in which a handful of APs were deployed on the same office floor. Today, however, with the proliferation of Wi-Fi APs in malls, theaters, and other large public and private spaces, the number of APs and users in the same geographical location is exploding. While mobility is greatly enhanced with these expanded networks, the ability to roam effectively and to associate with an appropriate AP is becoming more challenging.

SUMMARY

The described features generally relate to one or more improved methods, devices, and/or systems for wireless communications.

In one aspect, multidimensional techniques for roaming may be used by a station to identify an appropriate AP for association when a connection to a serving AP degrades. Once a roaming scan is triggered, the station may produce an initial set of candidate APs. The initial set may be identified based at least in part on an initial metric (e.g., beacon signal strength). A probe signal may be transmitted by the station to at least one of the candidate APs in the initial set and information may be received in response to the probe signals. The probe signal need not be a Probe Request as defined in, for example, an IEEE 802.11 specification. At least one additional metric may be identified for consideration in identifying a reduced set of candidates and the probe signal may be configured to obtain information corresponding to the additional metrics. This information may be used by the station to select those candidates in the initial set that have the desired criteria in one or more of the additional metrics. These candidates are included in the reduced set, which is then used to select a target AP for association with the station.

A method for wireless communications includes identifying an initial set of candidate access points produced by a roaming scan, where the initial set is identified based at least in part on an initial metric. The method includes transmitting a probe signal to at least one of the initial set of candidate access points. The method also includes receiving information responsive to the transmitted probe signals. The method further includes identifying a reduced set from the initial set, where the reduced set is identified based at least in part on the received information and being used to select a target access point. The method may include identifying at least one additional metric, where the probe signal is configured to obtain information corresponding to the at least one additional metric. The at least one additional metric may include one or more of a data throughput, a power consumption rate, a data packet power level, an acknowledgment packet power level, an access point line of sight range, a transmit diversity, a network loading (e.g., network loading history), a low-power feature, a transmit beamforming parameter, a multi-user multiple-input multiple-output (MIMO) parameter, a channel delay spread parameter, a blocker presence and magnitude parameter, a Space Time Block Coding (STBC) and/or Low-Density Parity-Check (LDPC) capability parameter, and an angle-of-arrival variation.

In some embodiments of the method, identifying the reduced set from the initial set includes identifying at least one additional metric based at least in part on the received information, and selecting candidate access points from the initial set for which the at least one additional metric is greater than a threshold value, and/or discarding candidate access points from the initial set for which the at least one additional metric is less than a threshold value. In some embodiments, identifying the reduced set from the initial set includes identifying additional metrics based at least in part on the received information, combining the additional metrics, and selecting candidate access points from the initial set for which the combined additional metrics are greater than a threshold value.

In some embodiments of the method, combining the additional metrics includes applying weighted factors to the additional metrics, and adapting (e.g., in an attempt to optimize) the weighted additional metrics with respect to one of the additional metrics. The initial metric may include a beacon power level. The method may include triggering the roaming scan during an idle associated mode or an active traffic mode based at least in part on a metric different from the initial metric. The method may include triggering the roaming scan when the initial metric is greater than a threshold value and at least one additional metric is less than a threshold value. The method may include adapting a threshold value used with the initial metric to identify the initial set.

A device for wireless communications includes a roaming module configured to identify an initial set of candidate access points produced by a roaming scan, where the initial set is identified based at least in part on an initial metric. The device also includes a transmitter configured to transmit a probe signal to at least one of the initial set of candidate access points. The device also includes a receiver configured to receive information responsive to the transmitted probe signals, wherein the roaming module is further configured to identify a reduced set from the initial set based at least in part on the received information and to use to the reduced set to select a target access point. The roaming module may be further configured to identify at least one additional metric and to configure the probe signal to obtain information corresponding to the at least one additional metric. The at least one additional metric may include one or more of a data throughput, a power consumption rate, a data packet power level, an acknowledgment packet power level, an access point line of sight range, a transmit diversity, a network loading (e.g., network loading history), a low-power feature, a transmit beamforming parameter, a multi-user multiple-input multiple-output (MIMO) parameter, a channel delay spread parameter, a blocker presence and magnitude parameter, an STBC and/or LDPC capability parameter, and an angle-of-arrival variation.

In some embodiments of the device, the roaming module is configured to identify the reduced set from the initial set by being configured to identify at least one additional metric based at least in part on the received information, and to select candidate access points from the initial set for which the at least one additional metric is greater than a threshold value. In some embodiments, the roaming module is configured to identify the reduced set from the initial set by being configured to identify additional metrics based at least in part on the received information, to combine the additional metrics, and to select candidate access points from the initial set for which the combined additional metrics are greater than a threshold value. The roaming module may be configured to combine the additional metrics by being configured to apply weighted factors to the additional metrics, and to adapt the weighted additional metrics with respect to one of the additional metrics. The initial metric may include a beacon power level. The roaming module may be further configured to trigger the roaming scan during an idle associated mode or an active traffic mode based at least in part on a metric different from the initial metric, and/or trigger the roaming scan when the initial metric is greater than a threshold value and at least one additional metric is less than a threshold value.

An apparatus for wireless communications includes means for identifying an initial set of candidate access points produced by a roaming scan, where the initial set is identified based at least in part on an initial metric. The apparatus includes means for transmitting a probe signal to at least one of the initial set of candidate access points. The apparatus also includes means for receiving information responsive to the transmitted probe signals. The apparatus further includes means for identifying a reduced set from the initial set, the reduced set being identified based at least in part on the received information and being used to select a target access point. The apparatus may further include means for identifying at least one additional metric, the probe signal being configured to obtain information corresponding to the at least one additional metric. The at least one additional metric may include one or more of a data throughput, a power consumption rate, a data packet power level, an acknowledgment packet power level, an access point line of sight range, a transmit diversity, a network loading (e.g., network loading history), a low-power feature, a transmit beamforming parameter, a multi-user multiple-input multiple-output (MIMO) parameter, a channel delay spread parameter, a blocker presence and magnitude parameter, an STBC and/or LDPC capability parameter, and an angle-of-arrival variation.

In some embodiments of the apparatus, the means for identifying the reduced set from the initial set includes means for identifying at least one additional metric based at least in part on the received information, and means for selecting candidate access points from the initial set for which the at least one additional metric is greater than a threshold value. In some embodiments, the means for identifying the reduced set from the initial set includes means for identifying additional metrics based at least in part on the received information, means for combining the additional metrics, and means for selecting candidate access points from the initial set for which the combined additional metrics are greater than a threshold value. The means for combining the additional metrics may include means for applying weighted factors to the additional metrics, and means for optimizing the weighted additional metrics with respect to one of the additional metrics. The initial metric may include a beacon power level. The apparatus may further include means for triggering the roaming scan during an idle associated mode or an active traffic mode based at least in part on a metric different from the initial metric. The apparatus may further include means for triggering the roaming scan when the initial metric is greater than a threshold value and at least one additional metric is less than a threshold value.

A computer program product includes a non-transitory computer-readable medium having code for causing at least one computer to identify an initial set of candidate access points produced by a roaming scan, where the initial set is identified based at least in part on an initial metric. The non-transitory computer-readable medium has code for causing the at least one computer to transmit a probe signal to at least one of the initial set of candidate access points. The non-transitory computer-readable medium also has code for causing the at least one computer to receive information responsive to the transmitted probe signals. The non-transitory computer-readable medium further has code for causing the at least one computer to identify a reduced set from the initial set, the reduced set being identified based at least in part on the received information and being used to select a target access point. The non-transitory computer-readable medium may have code for causing the at least one computer to identify at least one additional metric, where the probe signal is configured to obtain information corresponding to the at least one additional metric. The at least one additional metric may include one or more of a data throughput, a power consumption rate, a data packet power level, an acknowledgment packet power level, an access point line of sight range, a transmit diversity, a network loading (e.g., network loading history), a low-power feature, a transmit beamforming parameter, a multi-user multiple-input multiple-output (MIMO) parameter, a channel delay spread parameter, a blocker presence and magnitude parameter, an STBC and/or LDPC capability parameter, and an angle-of-arrival variation.

In some embodiments of the computer program product, the code for causing the at least one computer to identify the reduced set from the initial set includes code for causing the at least one computer to identify at least one additional metric based at least in part on the received information, and code for causing the at least one computer to select candidate access points from the initial set for which the at least one additional metric is greater than a threshold value, and/or code for causing the at least one computer to combine the additional metrics and causing the at least one computer to select candidate access points from the initial set for which the combined additional metrics are greater than a threshold value. The code for causing the at least one computer to combine the additional metrics includes code for causing the at least one computer to apply weighted factors to the additional metrics, and code for causing the at least one computer to adapt the weighted additional metrics with respect to one of the additional metrics. The non-transitory computer-readable medium further includes code for causing the at least one computer to trigger the roaming scan during an idle associated mode or an active traffic mode based at least in part on a metric different from the initial metric and/or code for causing the at least one computer to trigger the roaming scan when the initial metric is greater than a threshold value and at least one additional metric is less than a threshold value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims.

Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
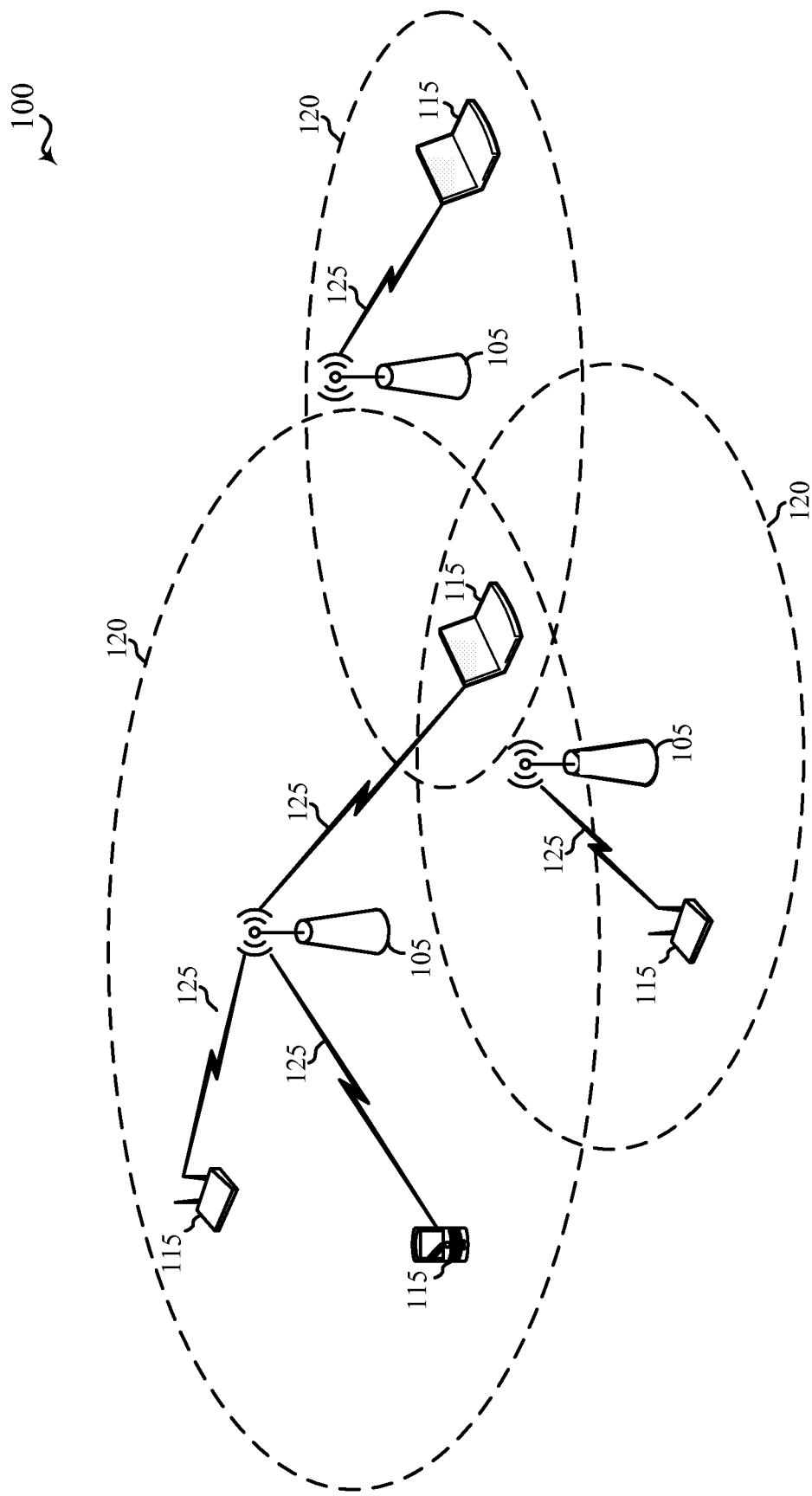
FIG. 1 shows a diagram that illustrates an example of a wireless local area network (WLAN) according to various embodiments.

Described embodiments are directed to methods, devices, and apparatuses for wireless communications using multidimensional techniques for roaming. In one aspect, an initial set of candidate APs is produced by a station using a roaming scan. The initial set may be identified based at least in part on an initial metric (e.g., beacon signal strength). A probe signal may be transmitted by the station to at least one of the candidate APs in the initial set and information may be received in response to the probe signals. The station may then identify a reduced set from the initial set based at least in part on the received information, where the reduced set is used to select a target AP. At least one additional metric may be identified and the probe signal may be configured to obtain information corresponding to the additional metrics. This information may be used by the station when selecting the candidate APs in the reduced set. In dual-band devices, for example, more than one probe signal may be sent at the same time (e.g., inter-band or intra-band) in order to adapt (e.g., optimize) the amount of time used during evaluation. That is, the number of simultaneous probe signals may be selected to improve the search space and time spent in evaluation of the search for candidate APs.

Using such techniques may allow for effective roaming as WiFi APs are more widely deployed. Traditional roaming algorithms tend to be very conservative in nature. For example, in traditional roaming algorithms only the received signal strength indication (RSSI) or signal-to-noise ratio (SNR) of a beacon (or sometimes of a packet) from an AP is monitored. The algorithm then reacts (i.e., initiates a roaming scan) when there is an RSSI or SNR breach (e.g., the beacon RSSI or BRSSI is below a threshold value). This leads to the station maintaining a "sticky" connection with the AP even as the connection data performance, measured in throughput, degrades due to several other factors including, but not limited to, medium congestion and medium collisions, but with RSSI or SNR above the threshold. It is not until the connection degrades significantly (e.g., a low BRSSI threshold is breached) that the station considers scanning for another AP with which to associate.

There may be instances, however, when the RSSI or SNR of the beacon signal is strong but the throughput or some other metric of the link or of the station is quite poor. This is quite common in CSMA-deployed networks where interfering signals from a neighboring basic service set (BSS) may increase the perceived signal strength on the device's antenna.

Fast roaming (IEEE 802.11r) attempts to minimize the roaming time by providing UMAC tunneling protocols for security key transfers between APs. This approach does not tackle the issue that a station will only sluggishly move out of an AP because the decision is based at least in part on criterion limited set of criteria: RSSI or SNR or some combination thereof. This limited criteria (or one-dimensional given that is generally based at least in part on signal characteristics alone) approach is what keeps a station connected to a degrading AP when more suitable APs are available. As long as the current AP does not degrade to the point that a roaming scan is triggered, the station stays connected. In the meantime, the station's performance may continue to spiral down as the modulation and coding scheme (MCS) gets lowered while trying to improve a higher packet error rate (PER) caused by higher MCS. Another issue is that the RSSI value of the beacon signal at a station could be very misleading as a result of co-located interference (e.g., from Bluetooth) or the presence of hidden nodes.

In general, traditional roaming algorithms may not consider other system metrics such as throughput, link quality or power consumption. Again, simply using the beacon RSSI to make roaming decisions is a very conservative approach which is aimed at prolonging the residence of the station in the serving AP instead of optimizing the performance of the station. In the process, the station may lose out on the possibility of being served by another AP that may offer higher throughput, lower power, or a combination of both.

The multidimensional techniques for roaming described herein may include the use of channel probing to identify candidate APs for association. Instead of having a station rely solely on a beacon power level (e.g., BRSSI or SNR) to make roaming decisions, the station may consider other metrics in the process. For example, the station may consider associating with an AP with which one or more metrics are optimized. Some of these metrics may include: (1) maximum throughput (e.g., maximum MCS); (2) lower power, including presence of certain low-power features like unscheduled automatic power save delivery (UAPSD), IEEE 802.11v suite of low-power features, higher DTIM count; (3) SNR/RSSI of unicastdata packets or from Acknowledgment (ACK) frames; (4) shortest line of sight (LOS) range to an AP (where shorter may be better); (5) number of transmit chains or transmit diversity (where higher diversity may be better); (6) BSS loading history; (7) support for transmit beamforming (TxBF), multi-user (MU), Space Time Block Coding (STBC) and/or Low Density Parity Codes (LPDC); and (8) angle-of-arrival (AoA) variation (from the channel probes) as a way of detecting mobility towards or away from neighboring APs. Detecting direction and/or motion to/from an AP with AoA, as well as velocity, may help identify the right AP by knowing that a station is entering its range/domain. Other advanced metrics could be the presence and amount of blocker signals, channel delay spread, detected Doppler, all of which are measured during beacon reception or from the response from the target AP to the probing signal.

In another aspect, other features may be included with the multidimensional techniques for roaming described herein. For example, a network assistance metric may be included during roaming for optimizing packet loss during roaming for delay/loss sensitive traffic. In addition, network assistance may be provided for security context transfer and the delay incurred in the process being weighed with respect to APs that are co-located (e.g., AP that are within the same device but offer more than one radio interface spanning one or more than one bands to mitigate effects of specific channel occupancy and/or utilize the propagation characteristics of different bands). Security context transfer may be immediate and, due to localized and consolidated view of security context within the device switching between the BSS's offered by such a device, can offer features that provide assurances about packet loss, buffering, jitter and mechanisms for transport of packets received during the transitory phase of roaming. Some of the APs that orchestrate as part of a group and are controlled by a common security controller/alternatively have mechanisms and protocols for communicating the security context amongst each other and provide assistance for transfer of security context but may or may not provide assurances about the time taken during this transfer and the packets received during the transitory phase. Some APs may not provide assistance either in terms of security context transfer nor any mechanism to bound/mitigate the packet loss incurred during the transitory roaming phase.

The various techniques described herein for wireless communications using a multidimensional algorithm for roaming are described with respect to WLAN or Wi-Fi networks. A WLAN or Wi-Fi network may refer to a network that is based at least in part on the protocols described in the various IEEE 802.11 standards (e.g., IEEE 802.11a/g, 802.11n, 802.11 ac, 802.11 ah, etc.), for example. However, the same or similar techniques may also be used in any wireless network (e.g., a cellular network). For example, the same or similar techniques may be used for various wireless communications systems such as cellular wireless systems, Peer-to-Peer wireless communications, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), Wi-Fi, IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a diagram 100 that includes an example of a WLAN or Wi-Fi network. An access point (AP) 105 (i.e., network device) may generate a wireless local area network, such as an IEEE 802.11 network, with client devices 115. The client devices 115, also referred to as wireless stations, stations, or STAs, may be distributed or deployed within a coverage area 120 of the WLAN. Each of the stations 115 may associate and communicate (using communication links 125) with one of the APs 105. Each AP 105 has a coverage area 120 such that stations 115 within that area can typically communicate with the AP 105. As shown in FIG. 1, a station 115 can be covered by more than one AP 105 and can therefore associate with different APs at different times depending on which one provides a more suitable connection. A set of stations 115 that communicate with each other may be referred to as a basic service set (BSS). An extended service set (ESS) is a set of connected BSSs and a distribution system (DS) (not shown) is used to connect access points in an extended service set.

When the connection between a station 115 and its serving AP 105 degrades, the station 115 may start a roaming operation (e.g., roaming scanning) to identify from nearby APs a set of AP candidates with which the station 115 can establish a good connection for association. Once a list of candidates is identified, the station 115 may rank the candidates and may attempt to associate with the top candidate first. If that association attempt does not work, the station 115 may go down the list of suitable candidates until a new association can be established.

During the roaming operation, the station 115 may receive beacon signals from the scanned APs and may use information from the beacon signals (e.g., beacon signal strength or BRSSI) as part of the information that is needed to identify the AP candidates. The station 115, however, may use other criteria, metrics, or parameters to identify or reduce the list or set of AP candidates. Thus, the station 115 may use channel probing as part of its roaming operations, which may include sampling macro conditions about AP candidates and may establish an ordering of candidates based at least in part on the metrics to be adapted (e.g., optimized). Metric optimization may refer to, but need not be limited to, having one or more metrics that are more heavily weighted or ranked when making a decision as to which candidates are more suitable for association. Metric optimization may also refer to ranking or ordering of the candidates according to one or more metrics that are more heavily weighted or ranked than the other metrics. Those candidates at the top or near the top of the ranking may be considered to be optimal for association.

As described herein, a multidimensional algorithm for roaming may refer to the use of multiple criteria, metrics, or parameters in making roaming decisions, including triggering roaming and/or identifying, selecting, ranking, and/or ordering AP candidates for association. FIGS. 2A-11 described below provide additional details on various aspects of using a multidimensional algorithm for roaming.

Figure 2A:
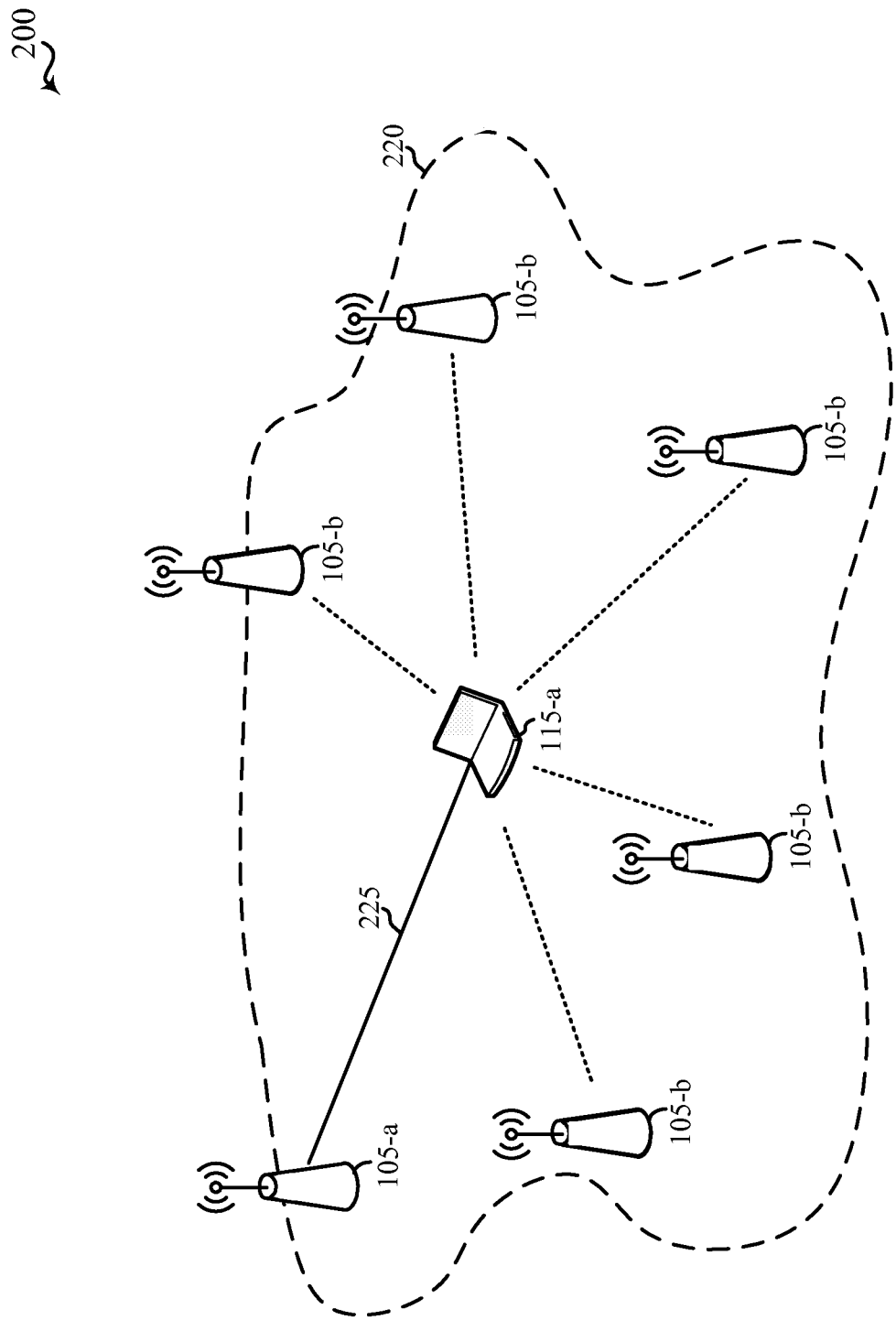
FIG. 2A shows a diagram that illustrates an example of a roaming decision according to various embodiments.

FIG. 2A shows a diagram 200 that illustrates a WLAN having a station 115-a associated with an AP 105-a through a communication link 225. The AP 105-a is part of a set 220 that includes several APs 105-b not associated with the station 115-a. The APs 105-b are potential candidates in case the station 115-a initiates a roaming operation (e.g., searches for another AP for association). The station 115-a may be an example of the stations 115 of FIG. 1. Similarly, the APs 105-a and 105-b may be examples of the APs 105 of FIG. 1.

Typically, the station 115-a may initiate a roaming operation when the BRSSI of the beacon signals from the AP 105-a degrades and falls below a threshold value (e.g., LOW_BRSSI_TH). This condition generally triggers a roaming algorithm for scanning various APs to identify suitable APs for association. In a multidimensional algorithm for roaming, while having a low BRSSI may still trigger roaming scanning, there may be other conditions (e.g., criteria, metrics, or parameters) that may also trigger roaming scanning even when BRSSI is sufficiently strong to maintain a strong connection with the serving AP (e.g., AP 105-a).

In a first scenario, when the station 115-a is in an idle associated mode with the AP 105-a, there is no traffic involved between the two devices. In this scenario, other metrics (other than BRSSI) may be used to decide whether to initiate roaming scanning, however, these metrics may not be available because of the lack of traffic. For example, information such as throughput, PER, and MCS may not be available. There are, however, metrics that are available during the idle associated mode and could be used. Power consumption and range from the station 115-a to the AP 105-a may be known and may be used to determine whether roaming scanning is to take place even when BRSSI is sufficiently strong. Power consumption can be indirectly measured by observing the number of beacon misses that are occurring or the amount of additional early time the device is awake to receive a beacon, drift of the beacon's target beacon transmit time (TBTT). These factors can lead to increased power consumption in the device, while the beacon RSSI may still be above a trigger threshold. Any of these metrics may be compared to a threshold value to determine if performance is below a desirable level and whether association to a different AP may be needed to improve performance. Note that in some embodiments, these additional metrics may be used to adapt the BRSSI threshold value and control the triggering of roaming scanning that way. For example, when one of the additional metrics is low, such condition may be used to adjust the BRSSI threshold value to trigger an earlier roaming scan with the expectation that a change to a different AP may address the low performing metric.

In a second scenario, when the station 115-a is in an active traffic mode with the AP 105-a, there is data being communicated between the two devices. In this scenario, other metrics (other than BRSSI) may be used to decide whether to initiate roaming scanning. For example, metrics that could be used include, but need not be limited to, prevailing MCS and associated PER, SNR/RSSI of ACK packets, and BSS loading, and channel retry attempt (a measure of BSS load/congestion)). These metrics may be used to determine whether roaming scanning is to take place even when BRSSI is sufficiently strong. Any of these metrics may be compared to a threshold value to determine if performance is below a desirable level and whether association to a different AP may be needed to improve performance. Note that in some embodiments, these additional metrics may be used to adapt the BRSSI threshold value and control the triggering of roaming scanning that way. For example, when one of the additional metrics is low, such condition may be used to adjust the BRSSI threshold value to trigger an earlier roaming scan with the expectation that a change to a different AP may address the low performing metric.

In both scenarios described above, the station 115-a may still determine whether to initiate a roaming scan (e.g., scanning different APs to determine if they are suitable candidates for association) by looking at the RSSI of the beacon signals provided by the serving AP 105-a. When RSSI remains less than a threshold value (e.g., LOW_RSSI_TRIGGER), and does so for at least a certain amount of hysteresis time (e.g., LOW_RSSI_HYST), roaming algorithms may be triggered by the station 115-a. The amount of hysteresis time considered may be adjusted based at least in part on the instantaneous rate of change in RSSI since a fixed hysteresis time may not cover fast changing scenarios.

In the second scenario, that is, during an active traffic mode, the roaming trigger may be based at least in part on the optimization goal being considered. For example, when the goals is to maintain or achieve high throughput, the station 115-a may maintain a pre-calibrated table (e.g., in memory or as part of a look-up table (LUT)) of the expected PER in good RSSI conditions for every MCS supported. Such MCS-PER table may be pre-loaded to the station 115-a or may be provided or adapted once the station 115-a is deployed. When PER is worse than estimated values on the table, a roaming scan may be triggered. In some instances, a tolerance may be introduced to the entries of the MCS-PER table to prevent false triggers, with the tolerance being adjusted based at least in part on data RSSI (DRSSI).

In another example, when power savings is the optimization goal during an active traffic mode, the station 115-a may look for APs that have longer delivery traffic indication message (DTIM) intervals. Longer intervals enable the station 115-a to remain in a power saving mode for longer. The station 115-a may also look for APs that have historically shown smaller target beacon transmit time (TBTT) jitter and/ or smaller multicast/broadcast packet arrival jitter having notified in the DTIM beacon. These conditions may allow the station 115-a to not have to wake up earlier than needed since the operations generally occur in a timely fashion. Moreover, the station 115-a may also look for APs with smaller packet leaks after PM bit entry indications (for AP to stop sending data and start buffer) because the station 115-a can remain in a power saving mode without concerns that the AP has not stopped sending data at the appropriate time. In some other instances, the station 115-a may look for AP that have advertised STBC and/or LDPC in their packet exchange procedure as these modes enable a more robust link and extended range, or for the same range, higher coding gain, thereby reducing probabilities of packet error and hence packet retries. In other instances, the station 115-a may look for AP that have beacon signals that arrive with the least amount of adjacent signal blockers or low channel delay spread. Each of these metrics is favorable to better signal reception.

Figure 2B:
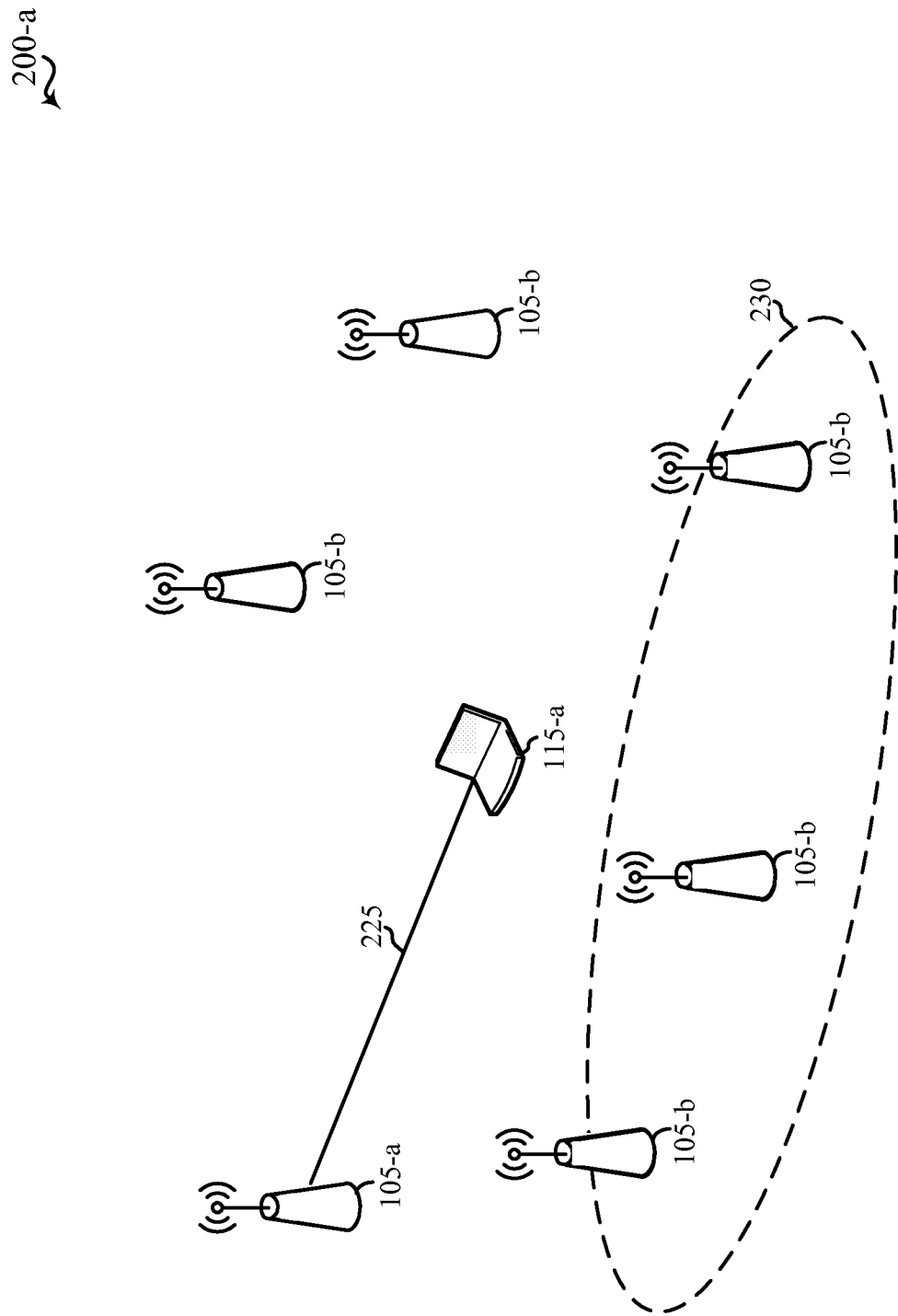
FIG. 2B shows a diagram that illustrates an example of identifying an initial set of candidate APs for association according to various embodiments.

FIG. 2B shows a diagram 200-a that illustrates an example of identifying an initial set of candidate APs for association with the station 115-a. After the roaming scans are performed, the station 115-a may use information collected when scanning the set 220 of FIG. 2A to identify an initial set 230 of AP candidates. One approach is to use the BRSSI information collected during the roaming scans to identify those APs 105-b that have a BRSSI that is within a threshold value of the BRSSI of the serving AP 105-a. Thus, there may be some APs that are suitable for the initial set 230 that have a BRSSI greater than that of the serving AP 105-a. Also, there may be APs that are suitable for the initial set 230 with a BRSSI that is less than that of the serving AP 105-a. One reason for APs with a lower BRSSI to be considered suitable is that they may offer other performance benefits based at least in part on additional metrics. That is, even with a slightly lower RSSI, those APs may offer higher throughput, lower power consumption, or a combination of both, when compared to the serving AP 105-a. Once the initial set 230 is identified, the station 115-a may proceed to further reduce the search space (e.g., further reduce the pool of AP candidates) by using channel probing techniques as described below in more detail.

Figure 2C:
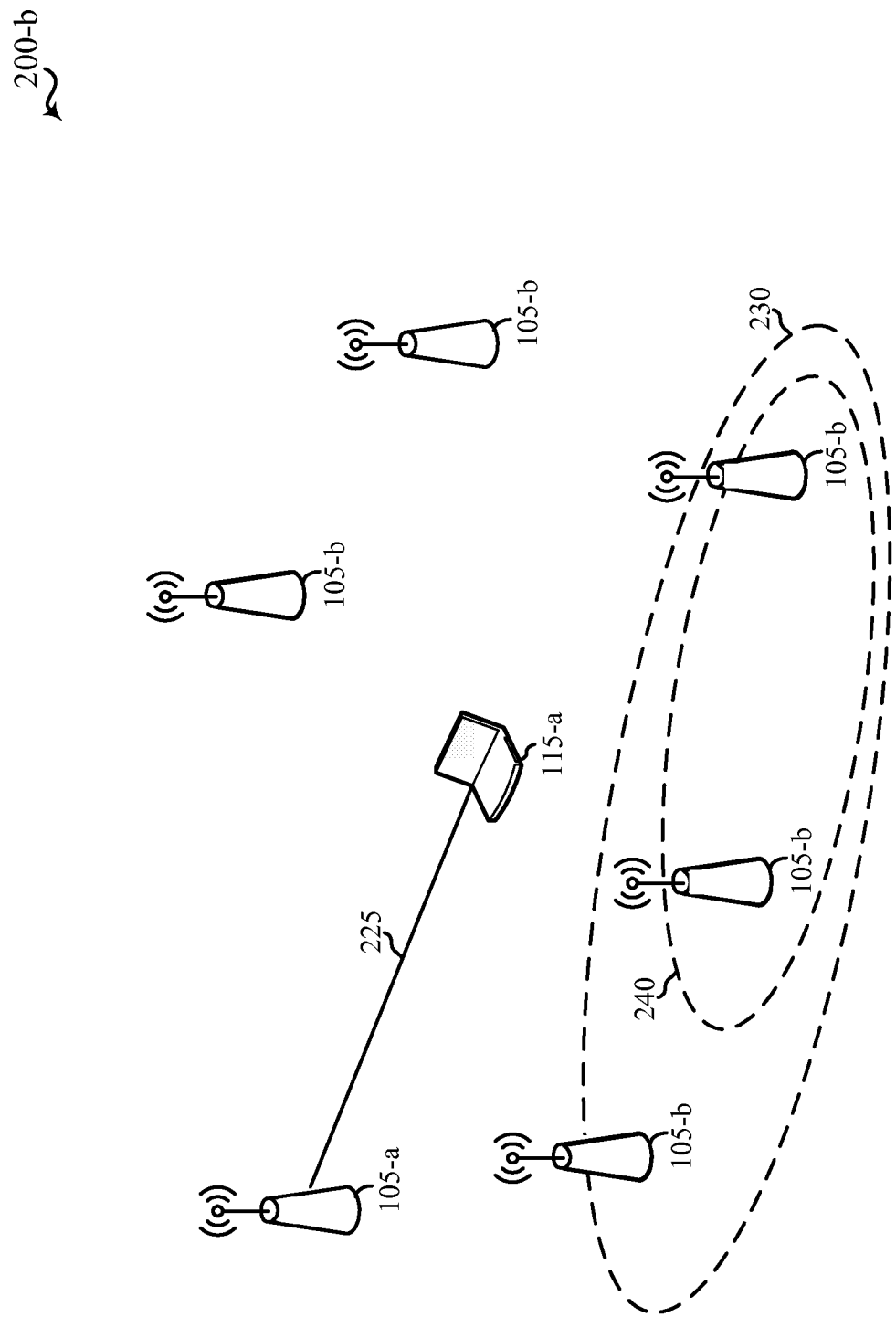
FIG. 2C shows a diagram that illustrates an example of identifying a subset of candidate APs using multiple metrics according to various embodiments.

FIG. 2C shows a diagram 200-b that illustrates an example of identifying a subset of candidate APs using multiple metrics. After the initial set 230 is identified, the station 115-a may use information collected during channel probing to further reduce the initial set 230 to a subset 240. Channel probing allows the station 115-a to request and/or obtain information about one or more metrics of interest to optimize the pool of candidate APs according to those metrics. For example, the station 115-a may request and/or obtain information about data throughput (e.g., maximum MCS), a power consumption rate, a data packet power level (e.g., SNR/RSSI), an ACK packet power level (e.g., SNR/RSSI), an AP range, a transmit diversity (e.g., 2×2, 3×3 diversity), a network loading (e.g., BSS load or back-off stalls) or loading history, a low-power feature (e.g., UAPSD), a transmit beamforming parameter, a downlink multi-user MIMO parameter, channel delay spread, blocker presence, STBC/LDPC usage, and an angle-of-arrival or AOA variation. The station 115-a may use this information to identify and rank those AP candidates in the initial set 230 that perform well (e.g., greater than a threshold level) in one or more of these metrics. In some instances, the station 115-a may combine the performance of multiple metrics to identify and rank those AP candidates in the initial set 230 that perform well in the combined metrics. In some embodiments, the combination of metrics may be implemented by applying weighted factors to the different metrics, with those metrics more heavily considered for an association having the greater or larger weights applied.

Figure 2D:
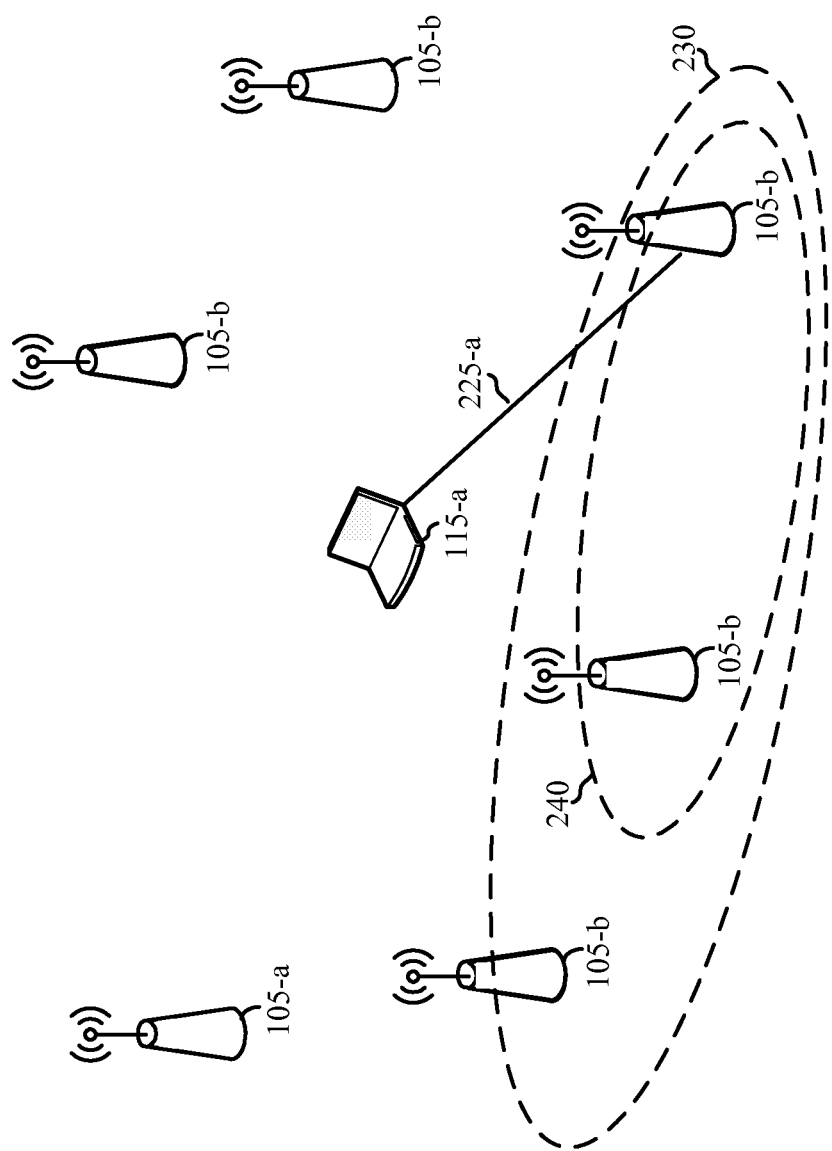
FIG. 2D shows a diagram that illustrates an example of a target AP selected from the subset of candidate APs according to various embodiments.

Once the subset 240 is identified (and the candidates ordered or ranked based at least in part on the additional metrics used), the station 115-a may proceed to select one of the candidate APs to attempt association. Typically, the optimal or highest ranked candidate is tried first and then others are tried according to the order or ranking if the attempt fails. FIG. 2D shows a new association established between the station 115-a and one of the candidate APs in the subset 240 through a communication link 225-a.

Figure 3:
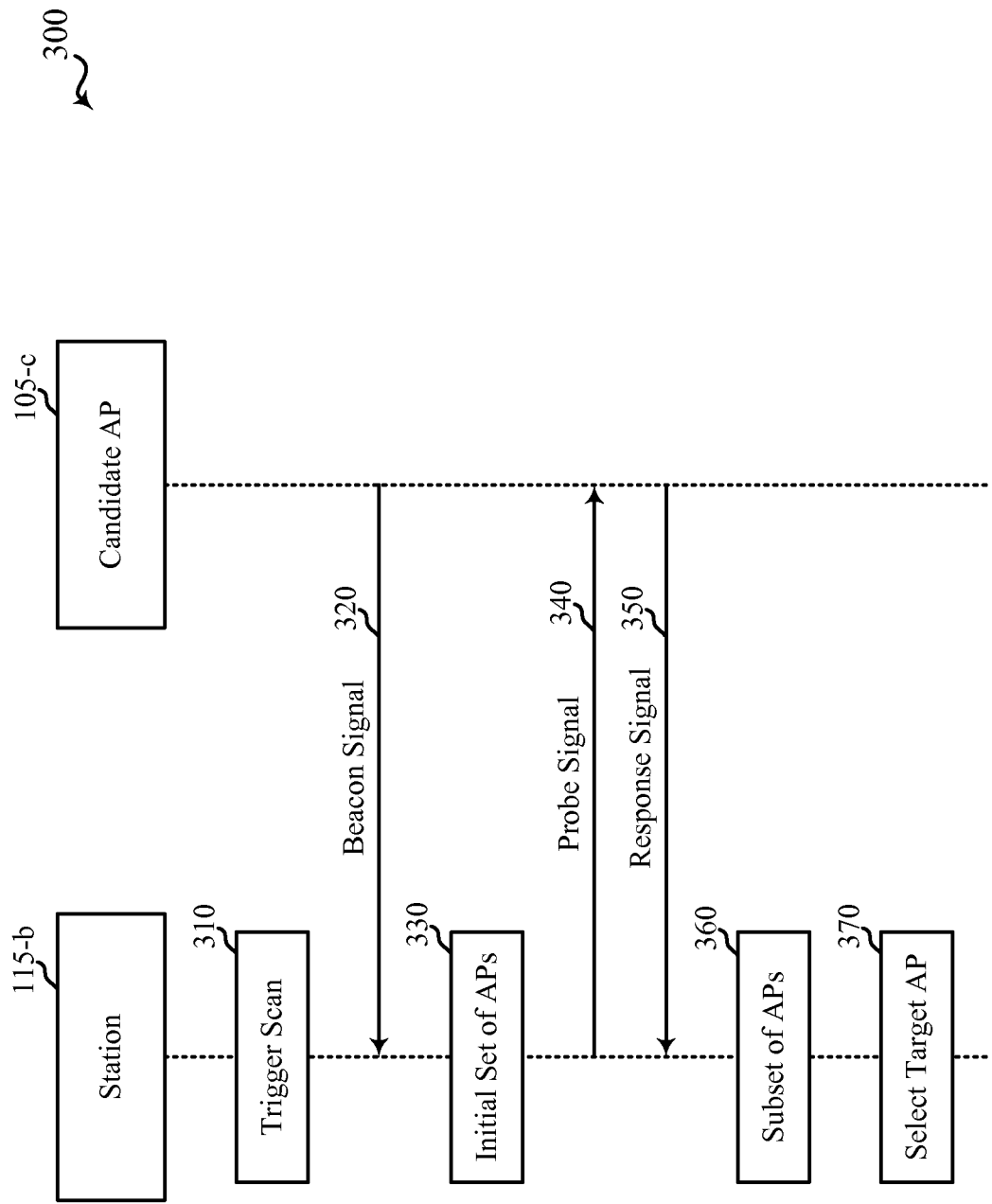
FIG. 3 shows a diagram that illustrates channel probing according to various embodiments.

FIG. 3 shows a diagram 300 that illustrates a channel probing mechanism that is used to obtain information about metrics for reducing an initial set of AP candidates. Channel probing relies on having a station (e.g., station 115-a) be able to send a data packet to any AP and receive a response back (e.g., ACK) without the need for association or authorization. Receipt of an ACK may be an indication that the AP has successfully decoded the data packet at the MCS and power at which the data packet was transmitted. It is, however, possible that some APs may not respond to a data frame if the frame originated from an unassociated station. In such cases, channel probing may not be applied to select such APs. For such APs, other public action frames may be sent to for probing. Channel probing, therefore, can be used to obtain information (e.g., criteria, metrics, parameters, measurements) about an AP candidate.

In FIG. 3, a station 115-b and an AP 105-c are shown exchanging signaling as part of a multidimensional algorithm for roaming. The station 115-b may be an example of the stations 115 and 115-a of FIGS. 1, 2A, 2B, 2C, and/or 2D. Similarly, the AP 105-c may be an example of the APs 105, 105-a, and 105-b of FIGS. 1, 2A, 2B, 2C, and/or 2D. At block 310, the station 115-b may trigger a roaming scan to initiate scanning for potential AP candidates. The roaming scan may be substantially as described above with respect to FIG. 2A. During the roaming scan, the station 115-b may receive beacon signals 320 from potential AP candidates (e.g., AP 105-c). The station 115-b may use information obtained from the beacon signals 320 (e.g., BRSSI) to identify at block 330 an initial set of AP candidates (e.g., initial set 230) for association. In this scenario, the AP 105-c is part of this initial set.

The station 115-b may then transmit a probe signal 340 to the AP 105-c to obtain information about one or more metrics. Responsive to the probe signal 340, the AP 105-c may transmit to the station 115-b a response signal 350, which may include information (e.g., content, parameters, or the like) about the metrics indicated or associated with the probe signal 340. At block 360, the station 115-b may identify a subset of the AP candidates based at least in part on the metrics information received through the response signal(s) 350. The station 115-b may rank or order the AP candidates that made the reduced set at block 360 and may select the top (or optimal) AP candidate as a target AP for association at block 370.

Based at least in part on a same or similar mechanism as those described above with respect to FIG. 3, channel probing for different criteria, metrics, or parameters may be implemented as described in more detail below.

When using channel probing for optimal MCS selection, a station (e.g., station 115-a) may transmit or send a dummy packet at a certain MCS and wait to receive an ACK. If the ACK is received, then the channel between the candidate AP and the station, which may be referred too as the AP-STA channel, supports that MCS. The station may continue testing until the channel between the candidate AP and the station that supports the highest MCS is identified.

Optionally, the station may transmit or send short interframe space (SIFS)-burst packets of different progressively increasing MCSs and may collect the respective ACKs to find the highest MCS that was successfully decoded by a candidate AP. The candidate AP-STA channel that supports the highest MCS may be selected as the target AP.

When using channel probing for optimal power, a station (e.g., station 115-a) may transmit or send a packet to an AP at a certain fixed MCS and a certain back-off transmit power, and wait to receive an ACK. If the ACK is received, then the AP-STA channel supports that fixed MCS at the backed-off transmit power. The station may continue testing until the AP-STA channel that supports the lowest transmit power is identified.

Optionally, the station may transmit or send SIFS-burst packets at a fixed MCS and different backed-off power levels and may collect the respective ACKs to find the lowest transmit power that the AP can support. The candidate AP-STA channel that supports the lowest transmit power for the given MCS may be selected as the target AP.

When using channel probing for an optimal combination of MCS and power, a station (e.g., station 115-a) may transmit or send SIFS-burst packets of varying MCS and transmit powers. The station may then adapt the AP candidate selection for target AP based at least in part on both minimum transmit power and highest MCS.

When using channel probing for optimal line of sight (LOS) AP range, a station (e.g., station 115-a) may time-stamp a packet transmitted or sent to an AP, and may also time-stamp an ACK received from the AP, with consideration being taken to account for first path arrival correction. These time-stamps may be used by the station to determine a round-trip time delay (RTTD) for different APs and identify the AP that is closest to the station. An AP in closer range to the station may yield lower transmit power and have the ideal or preferred channel characteristics to decode signals.

When using channel probing for optimal number of transmit antennas or antenna chains (e.g., transmit diversity), a station (e.g., station 115-a) may receive a beacon signal from a candidate AP and may use the beacon signal to determine or identify the transmit capabilities of the AP (e.g., from a capability information element or IE), and select the AP that has the highest number of transmit antennas or antenna chains. The higher the transmit (antenna) diversity of the AP, the better the reception of beacon signals and data signals from the AP. For example, a 3×3 transmit diversity scheme may provide better reception at the station than a 2×2 transmit diversity scheme.

When using channel probing for optimal high throughput/very high throughput (HT/VHT) ACK SNR/RSSI, a station (e.g., station 115-a) may transmit or send dummy HT/VHT packets and wait to receive an HT/VHT ACK. The station may measure the HT/VHT ACK RSSI and SNR and may select for a target AP the AP that provides the highest HT/VHT ACK RSSI and SNR.

When using channel probing for optimal angle-of-arrival variation, a station (e.g., station 115-a) may transmit or send successive frames, SIFS-bursted, and measure the angle-of-arrival (e.g., by using multiple antennas) from the received response to detect variation in the angle-of-arrival and thereby determine mobility and/or direction of the station with respect to an AP. If the station is moving away from the AP, that AP may be less likely to provide and maintain a good connection with the station even though other metrics may be faring well for that AP. If the station is moving towards the AP, that AP may be more likely to provide and maintain a good connection with the station, even though it may not be the best AP in the candidate list.

When using channel probing for optimal network load, a station (e.g., station 115-a) may keep track of the number of transmit packet failures (e.g., no ACK received) as a way to determine the channel interference and collision of the network. Once the roaming scans have started, the station may periodically transmit or send dummy packets to candidate APs and wait to receive their ACKs. Missing ACKs may be an indication that the network load is too heavy and the station may use this information in making a decision regarding a target AP for association.

Figure 4:
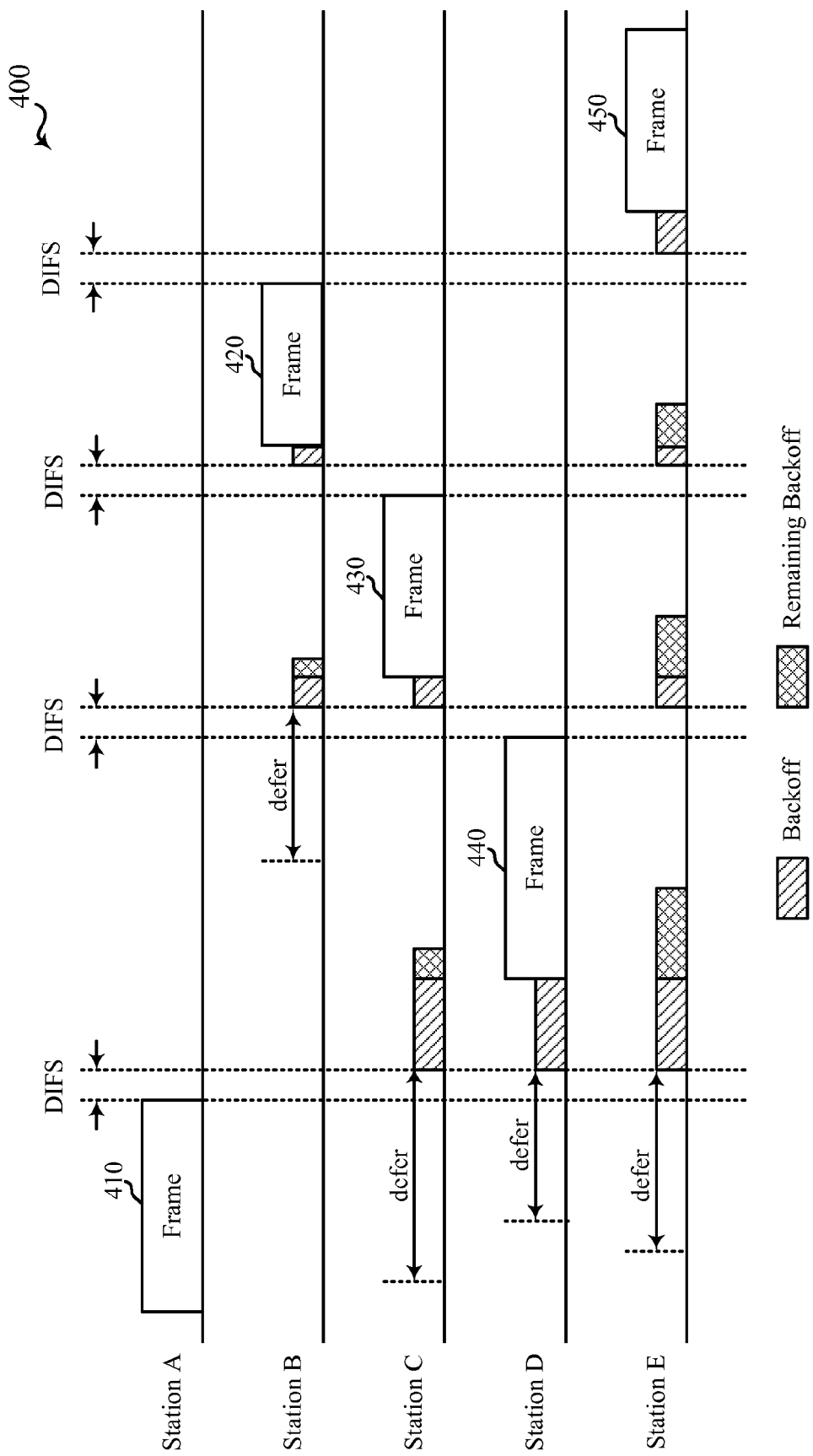
FIG. 4 shows a diagram that illustrates an example of probing a network load according to various embodiments.

FIG. 4 shows a diagram 400 that illustrates another example of using channel probing for optimal network (e.g., BSS) load. In FIG. 4, multiple stations attempt to send frames over a channel. The number of back-off stalls that take place because of contention and re-starts before successfully acquiring the channel may be an indication or estimate of the channel load. For example, station A is able to transmit frame 410 on a first attempt. Stations B and C, however, need to two backoffs before sending frames 420 and 430, respectively. Station D needs to one backoff before sending frame 440 and station E needs four backoffs before sending frame 450. In this example, a network load is heavier from the perspective of station E compared to the perspective of station A since station E needed more tries before acquiring the channel for transmission. With this approach, it may be possible to have a local mechanism for estimating channel congestion in the local BSS. This approach may be used by a station to estimate the BSS loading in adjacent/candidate APs.

Figure 5A:
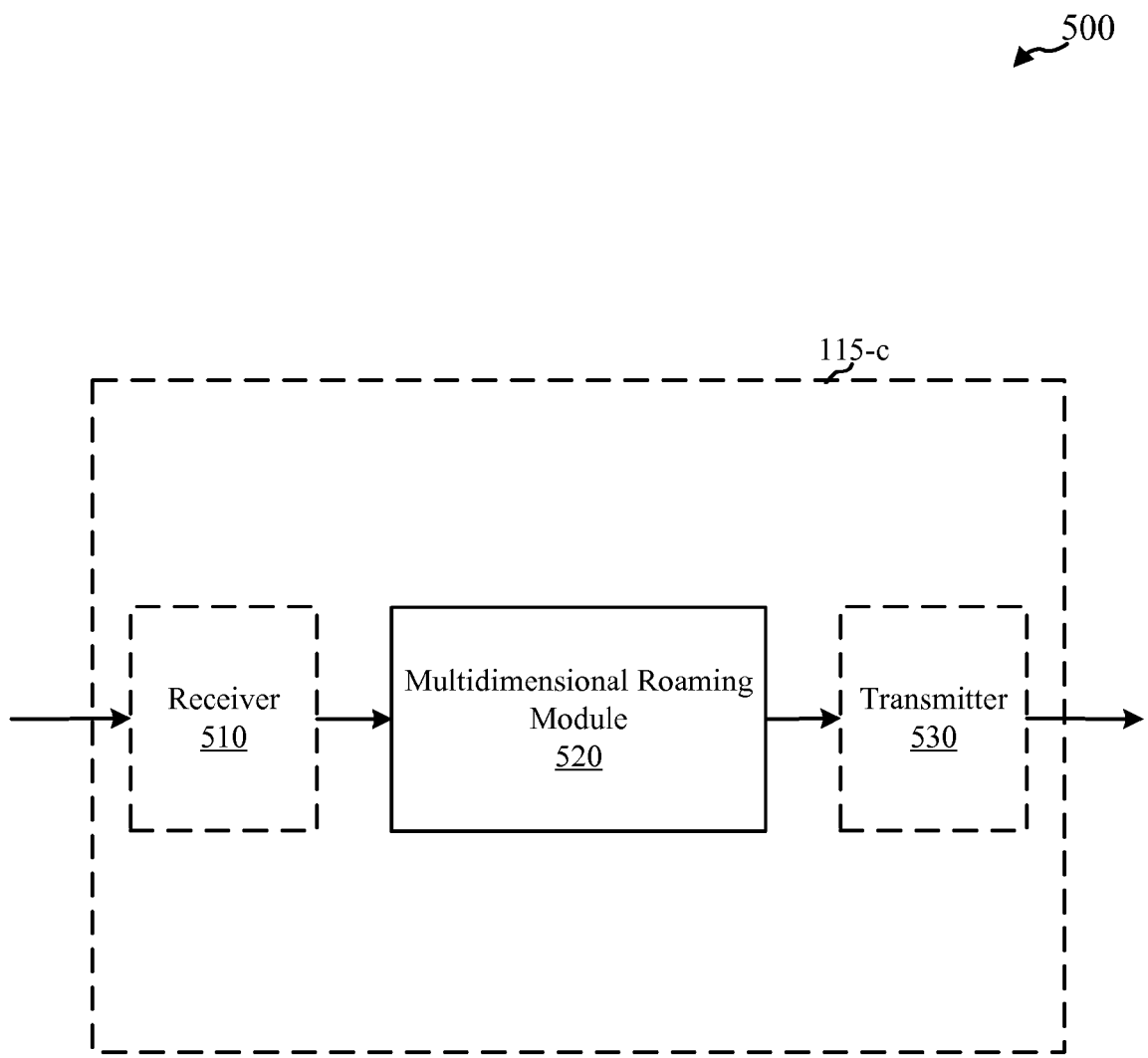
FIGS. 5A and 5B show diagrams that illustrate examples of devices (e.g., stations) for use in wireless communications according to various embodiments.

FIG. 5A shows a diagram 500 having a device 115-c for use in wireless communications that support a multidimensional algorithm for roaming. In some embodiments, the device 115-c may be an example of one or more aspects of one of the stations 115 described with reference to FIGS. 1, 2A, 2B, 2C, 2D, and/or 3. The device 115-c, or portions of it, may also be a processor. The device 115-c may include a receiver 510, a multidimensional roaming module 520, and/or a transmitter 530. Each of these components may be in communication with each other.

In some embodiments, the receiver 510 may be or include an RF receiver. The RF receiver may include separate receivers for the different bands. For example, the RF receiver may include a receiver (i.e., part of a radio or modem) operable to receive transmissions in one or more Wi-Fi bands (e.g., 2.4 GHz, 5 GHz). The receiver 510 may be used to receive various types of data and/or control signals (i.e., transmissions) over one or more communication links of a wireless communications system, such as one or more communication links of the WLAN or Wi-Fi networks described with reference to FIGS. 1, 2A, 2B, 2C, and/or 2D.

In some embodiments, the transmitter 530 may be or include an RF transmitter. The RF transmitter may include separate transmitters for the different bands. For example, the RF transmitter may include a transmitter (i.e., part of a radio or modem) operable to transmit in one or more Wi-Fi bands (e.g., 2.4 GHz, 5 GHz). The transmitter 530 may be used to transmit various types of data and/or control signals (i.e., transmissions) over one or more communication links of the WLAN or Wi-Fi networks described with reference to FIGS. 1, 2A, 2B, 2C, and/or 2D.

In some embodiments, the multidimensional roaming module 520 is configured to identify an initial set of candidate APs (e.g., initial set 230) produced by a roaming scan. The initial set may be identified based at least in part on an initial metric (e.g., beacon signal strength or BRSSI). The multidimensional roaming module 520 and/or the transmitter 530 may be configured to transmit a probe signal (e.g., probe signal 340) to at least one of the initial set of candidate APs. The multidimensional roaming module 520 and/or the receiver 510 may be configured to receive information (e.g., response signal 350) responsive to the transmitted probe signals. The multidimensional roaming module 520 may be configured to identify a reduced set (e.g., reduced set 240) from the initial set, where the reduced set is identified based at least in part on the received information and is used to select a target AP for association. In some instances, the multidimensional roaming module 520 may be configured to look for AP that have advertised STBC and/or LDPC in their packet exchange procedure as these modes enable a more robust link and extended range, or for the same range, higher coding gain, thereby reducing probabilities of packet error and hence packet retries. In other instances, the multidimensional roaming module 520 may look for AP that have beacon signals that arrive with the least amount of adjacent signal blockers or low channel delay spread. Each of these metrics is favorable to better signal reception.

In some embodiments, the multidimensional roaming module 520 is configured to identify at least one additional metric. The multidimensional roaming module 520 and/or the transmitter 530 may configure the probe signal to obtain information corresponding to the at least one additional metric. The at least one additional metric may include one or more of a data throughput (e.g., maximum MCS), a power consumption rate, a data packet power level (e.g., SNR/RSSI), an acknowledgment (ACK) packet power level (e.g., SNR/RSSI) for HT/VHT ACK frame, a line of sight AP range, a transmit diversity (e.g., 2×2, 3×3 diversity), a network loading (e.g., BSS load or back-off stalls), a low-power feature (e.g., UAPSD), a transmit beamforming parameter, a multi-user MIMO parameter, blocker presence, channel delay spread, support for STBC/LDPC, and an angle-of-arrival or AOA variation.

In some embodiments, the multidimensional roaming module 520 is configured to identify the reduced set from the initial set by identifying at least one additional metric based at least in part on the received information, and by selecting candidate APs from the initial set for which the at least one additional metric is greater than a threshold value. In some embodiments, the multidimensional roaming module 520 is configured to identify the reduced set from the initial set by identifying at least one additional metric based at least in part on the received information, and by discarding candidate APs from the initial set for which the at least one additional metric is less than a threshold value. In some embodiments, the multidimensional roaming module 520 is configured to identify the reduced set from the initial set by identifying additional metrics based at least in part on the received information, by combining the additional metrics, and by selecting candidate APs from the initial set for which the combined additional metrics are greater than a threshold value. Combining the additional metrics may include applying weighted factors to the additional metrics, and optimizing the weighted additional metrics with respect to one of the additional metrics In some embodiments, the initial metric includes a beacon power level (e.g., BRSSI). The multidimensional roaming module 520 may be configured to adapt a threshold value used with the initial metric to identify the initial set. Moreover, the roaming scan may be triggered by the multidimensional roaming module 520 during an idle associated mode or an active traffic mode based at least in part on a metric different from the initial metric. For example, for the idle associated mode, metrics such as power, measured by direct or indirect methods like TBTT jitter, larger early-RX wake-ups, larger multicast/broadcast jitter, AP line of sight range may be considered by the multidimensional roaming module 520 to trigger the roaming scan. That is, roaming scan may be triggered by dynamically changing events. For the active traffic mode, metrics such as MCS or throughput, SNR/RSSI of ACK packet, and/or network loading (e.g., BSS loading) may be considered to trigger the roaming scan. In addition, the roaming scan may be triggered by the multidimensional roaming module 520 when the initial metric is greater than a threshold value (e.g., the BRSSI level is sufficient for a good connection) and at least one additional metric is less than a threshold value (e.g., PER level is too low).

Figure 5B:
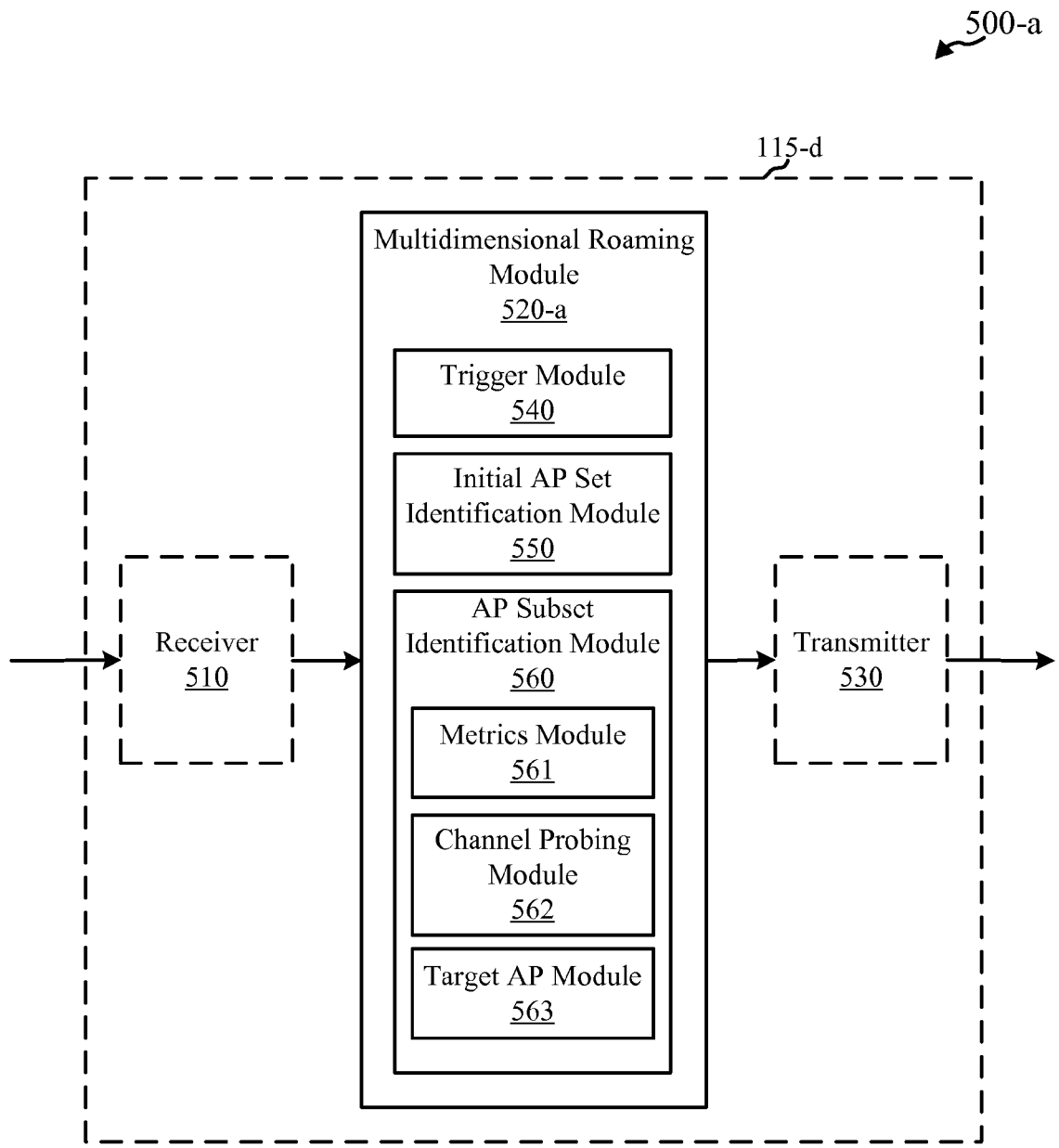

FIG. 5B shows a diagram 500-*a* having a device 115-*d* for use in wireless communications that support a multidimensional algorithm for roaming. In some embodiments, the device 115-*d* may be an example of the device 115-*c* of FIG. 5A. The device 115-*d*, or portions of it, may also be a processor. The device 115-*d* may include the receiver 510, a multidimensional roaming module 520-*a*, and/or the transmitter 530. Each of these components may be in communication with each other.

The receiver 510 and the transmitter 530 are described above with respect to FIG. 5A. The multidimensional roaming module 520-*a* may be an example of the multidimensional roaming module 520 of FIG. 5A, and may include a trigger module 540, an initial AP set identification module 550, and an AP subset identification module 560. The AP subset identification module 560 may include a metrics module 561, a channel probing module 562, and a target AP module 563. Each of these components may be in communication with each other.

The trigger module 540 may be configured to handle aspects described at least with respect to FIGS. 1, 2A, 2B, 2C, 2D, 3, and/or 4 related to triggering, initiating, and/or performing a roaming scan and handling information collected as part of the roaming scan operation.

The initial AP set identification module 550 may be configured to handle aspects described at least with respect to FIGS. 1, 2A, 2B, 2C, 2D, 3, and/or 4 related to identifying and/or processing an initial set of AP candidates (e.g., initial set 230).

The AP subset identification module 560 may be configured to handle aspects described at least with respect to FIGS. 1, 2A, 2B, 2C, 2D, 3, and/or 4 related to identifying and/or processing a subset from the initial set of AP candidates (e.g., subset 240) and selecting one of the candidates in the subset to establish a new association.

The metrics module 561 may be configured to handle aspects described at least with respect to FIGS. 1, 2A, 2B, 2C, 2D, 3, and/or 4 related to identifying, processing, and using additional metrics in a multidimensional algorithm for roaming.

The channel probing module 562 may be configured to handle aspects described at least with respect to FIGS. 1, 2A, 2B, 2C, 2D, 3, and/or 4 related to performing channel probing for one or more metrics and/or processing information collected as part of the channel probing of the one or more metrics, including combination, optimization, ranking, and/or ordering operations.

The target AP module 563 may be configured to handle aspects described at least with respect to FIGS. 1, 2A, 2B, 2C, 2D, 3, and/or 4 related to selecting one of the candidate APs in the subset for establishing a new association.

The components of the devices 115-*c* and 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 5C:
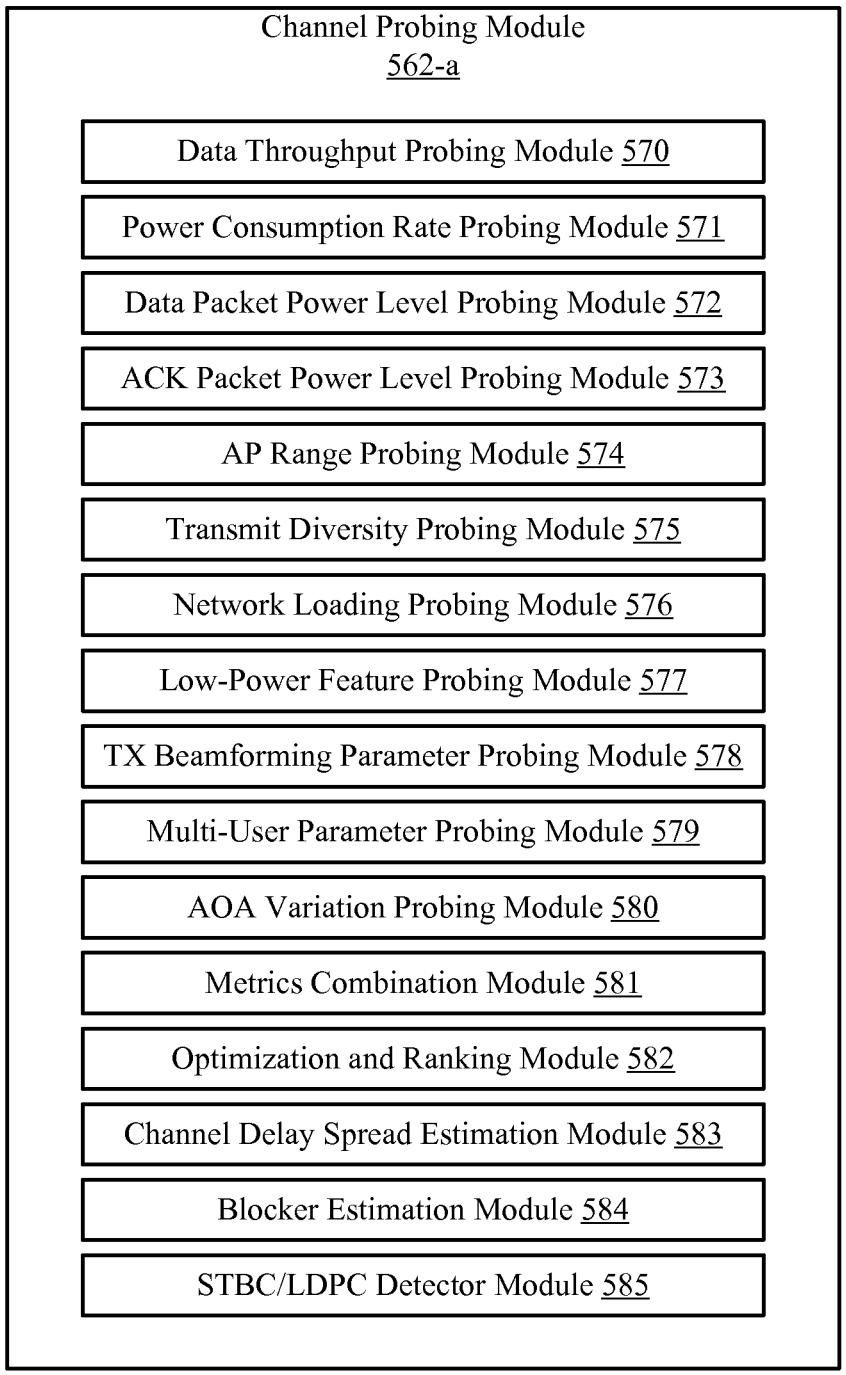
FIG. 5C shows a diagram that illustrates an example of a channel probing module according to various embodiments.

FIG. 5C shows a diagram 500-b having a channel probing module 562-a that is an example of the channel probing module 562 of FIG. 5B. The channel probing module 562-a may include a data throughput probing module 570, a power consumption rate probing module 571, a data packet power level probing module 572, an ACK packet power level probing module 573, an AP range probing module 574, a transmit diversity probing module 575, a network loading probing module 576, a low-power feature probing module 577, a transmit (TX) beamforming parameter probing module 578, a multi-user parameter probing module 579, an AOA variation probing module 580, a metrics combination module 581, an optimization and ranking module 582, a channel delay estimation module 583, a blocker estimation module 584, and an STBC/LDPC detector module 585.

The data throughput probing module 570 may be configured to handle aspects described at least with respect to FIGS. 1, 2A, 2B, 2C, 2D, 3, and/or 4 related to channel probing to optimize data throughput (e.g., maximum MCS) for identifying a subset of AP candidates.

The power consumption rate probing module 571 may be configured to handle aspects described at least with respect to FIGS. 1, 2A, 2B, 2C, 2D, 3, and/or 4 related to channel probing to optimize power consumption rate for identifying a subset of AP candidates.

The data packet power level probing module 572 may be configured to handle aspects described at least with respect to FIGS. 1, 2A, 2B, 2C, 2D, 3, and/or 4 related to channel probing to optimize data packet power level (e.g., SNR/RSSI) for identifying a subset of AP candidates.

The ACK packet power level probing module 573 may be configured to handle aspects described at least with respect to FIGS. 1, 2A, 2B, 2C, 2D, 3, and/or 4 related to channel probing to optimize ACK packet power level (e.g., SNR/RSSI) for identifying a subset of AP candidates.

The AP range probing module 574 may be configured to handle aspects described at least with respect to FIGS. 1, 2A, 2B, 2C, 2D, 3, and/or 4 related to channel probing to optimize the range between a station and an AP for identifying a subset of AP candidates.

The transmit diversity probing module 575 may be configured to handle aspects described at least with respect to FIGS. 1, 2A, 2B, 2C, 2D, 3, and/or 4 related to channel probing to optimize transmit diversity (e.g., improve reception at the station) for identifying a subset of AP candidates.

The network loading probing module 576 may be configured to handle aspects described at least with respect to FIGS. 1, 2A, 2B, 2C, 2D, 3, and/or 4 related to channel probing to optimize network (e.g., BSS) loading for identifying a subset of AP candidates.

The low-power feature probing module 577 may be configured to handle aspects described at least with respect to FIGS. 1, 2A, 2B, 2C, 2D, 3, and/or 4 related to channel probing to optimize low power features (e.g., UAPSD, IEEE 802.11c suite of low-power features) for identifying a subset of AP candidates.

The transmit (TX) beamforming parameter probing module 578 may be configured to handle aspects described at least with respect to FIGS. 1, 2A, 2B, 2C, 2D, 3, and/or 4 related to channel probing to optimize TX beamforming parameter for identifying a subset of AP candidates.

The multi-user parameter probing module 579 may be configured to handle aspects described at least with respect to FIGS. 1, 2A, 2B, 2C, 2D, 3, and/or 4 related to channel probing to optimize a multi-user parameter for identifying a subset of AP candidates. In some instances, the multi-user parameter probing module 579 may be configured to handle aspects related to looking for AP that have beacon signals that arrive with the least amount of adjacent signal blockers or low channel delay spread. Each of these metrics is favorable to better signal reception.

The AOA variation probing module 580 may be configured to handle aspects described at least with respect to FIGS. 1, 2A, 2B, 2C, 2D, 3, and/or 4 related to channel probing to optimize AOA variation for identifying a subset of AP candidates.

The metrics combination module 581 may be configured to handle aspects described at least with respect to FIGS. 1, 2A, 2B, 2C, 2D, 3, and/or 4 related to combining multiple metrics or information corresponding to multiple metrics. The combination may include applying weighted factors to different metrics, where the value of the weighted factors may be higher for those metrics that are more heavily considered when making a decision as to which candidates are more suitable for association.

The optimization and ranking module 582 may be configured to handle aspects described at least with respect to FIGS. 1, 2A, 2B, 2C, 2D, 3, and/or 4 related to optimizing, ranking, and/or ordering AP candidates according to metrics information.

The channel delay estimation module 583 may be configured to handle aspects described at least with respect to FIGS. 1, 2A, 2B, 2C, 2D, 3, and/or 4 related to estimating a channel delay or channel delay spread.

The blocker estimation module 584 may be configured to handle aspects described at least with respect to FIGS. 1, 2A, 2B, 2C, 2D, 3, and/or 4 related to detecting a presence of a blocker signals and/or estimating a magnitude (e.g., value) of the blocker signal.

The STBC/LDPC detector module 585 may be configured to handle aspects described at least with respect to FIGS. 1, 2A, 2B, 2C, 2D, 3, and/or 4 related to detecting advertised support for STBC and/or LDPC in an AP.

Figure 6:
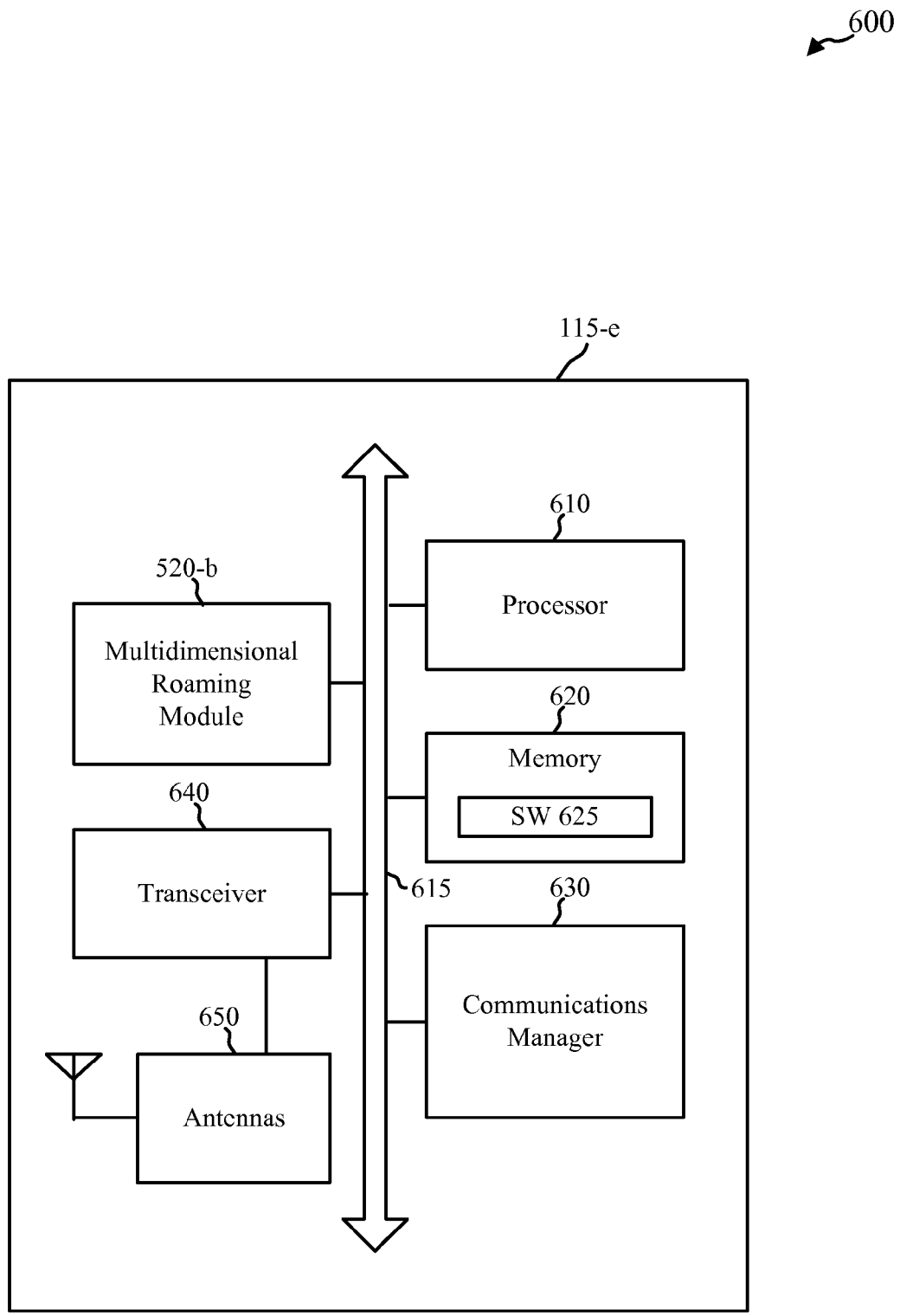
FIG. 6 shows a block diagram that illustrates an example of station architecture according to various embodiments.

FIG. 6 shows a diagram 600 that illustrates a wireless terminal or station 115-e configured for using a multidimensional algorithm for roaming. The station 115-e may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-e may have an internal power supply (not shown), such as a small battery, to facilitate mobile operation. The station 115-e may be an example of the stations 115 of FIGS. 1, 2A, 2B, 2C, 2D, 3, 5A, and/or 5B. The station 115-e may be configured to implement at least some of the features and functions described above with respect to FIGS. 1-5C.

The station 115-e may include a processor 610, a memory 620, transceivers 640, antennas 650, and a multidimensional roaming module 520-b. Moreover, the multidimensional roaming module 520-b may be an example of the multidimensional roaming modules 520 and 520-a of FIG. 5A and FIG. 5B. Each of these components may be in communication with each other, directly or indirectly, over one or more buses 615.

The memory 620 may include random access memory (RAM) and read-only memory (ROM). The memory 620 may store computer-readable, computer-executable software (SW) code 625 containing instructions that are configured to, when executed, cause the processor 610 to perform various functions described herein for handling a multidimensional algorithm for roaming. Alternatively, the software code 625 may not be directly executable by the processor 610 but be configured to cause the computer (e.g., when compiled and executed) to perform functions described herein.

The processor 610 may include an intelligent hardware device, e.g., a central processing unit (CPU), a microcontroller, an ASIC, etc. The processor 610 may process information received through the transceivers 640. The processor 610 may process information to be sent to the transceivers 640 for transmission through the antennas 650. The processor 610 may handle, alone or in connection with the multidimensional roaming module 520-b, various aspects of handling a multidimensional algorithm for roaming.

The transceivers 640 may be configured to communicate bi-directionally with access points (e.g., access points 105). The transceivers 640 may be implemented as one or more transmitters and one or more separate receivers. The transceivers 640 may support communications with a WLAN or Wi-Fi network. The transceivers 640 may include a modem configured to modulate the packets and provide the modulated packets to the antennas 650 for transmission, and to demodulate packets received from the antennas 650.

According to the architecture of FIG. 6, the station 115-e may further include a communications manager 630. The communications manager 630 may manage communications with various network devices (e.g., access points). The communications manager 630 may be a component of the station 115-e in communication with some or all of the other components of the station 115-e over the one or more buses 615. Alternatively, functionality of the communications manager 630 may be implemented as a component of the transceivers 640, as a computer program product, and/or as one or more controller elements of the processor 610.

The multidimensional algorithm module 520-b may be configured to perform various aspects related to using multiple metrics, criteria, or parameters for roaming decisions. Moreover, some or all of the functionality of the multidimensional algorithm module 520-b may be performed by the processor 610 and/or in connection with the processor 610.

Figure 7:
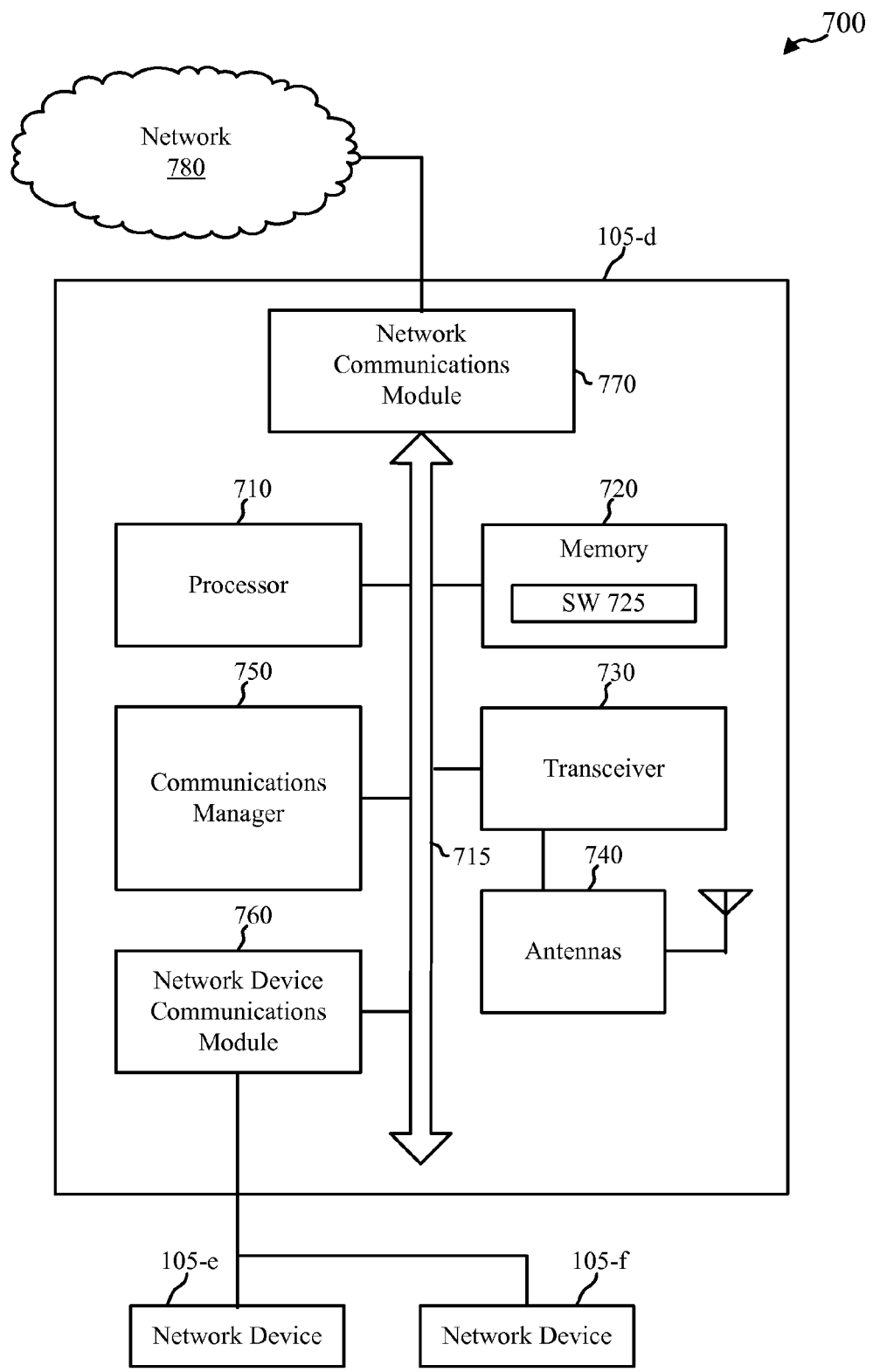
FIG. 7 shows a block diagram that illustrates an example of an AP architecture according to various embodiments.

FIG. 7 shows a diagram 700 that illustrates an AP 105-d. In some embodiments, the AP 105-d may be an example of the APs 105 of FIGS. 1, 2A, 2B, 2C, 2D, and/or 3. The AP 105-d may be configured to implement at least some of the features and functions described above with respect to FIGS. 1-3. The AP 105-d may include a processor 710, a memory 720, transceivers 730, and antennas 740. The AP 105-d may also include one or both of a network device communications module 760 and a network communications module 770. Each of these components may be in communication with each other, directly or indirectly, over one or more buses 715.

The memory 720 may include RAM and ROM. The memory 720 may also store computer-readable, computer-executable software (SW) code 725 containing instructions that are configured to, when executed, cause the processor 710 to perform various functions described herein for transmitting beacon signals, and for receiving probing signals from stations and responding to such probing signals. Alternatively, the software code 725 may not be directly executable by the processor 710 but be configured to cause the computer, e.g., when compiled and executed, to perform functions described herein.

The processor 710 may include an intelligent hardware device, e.g., a CPU, a microcontroller, an ASIC, etc. The processor 710 may process information received through the transceivers 730, the network device communications module 760, and/or the network communications module 770. The processor 710 may also process information to be sent to the transceivers 730 for transmission through the antennas 740, to the network device communications module 760, and/or to the network communications module 770. The processor 710 may handle, alone or in connection with another component of the AP 105-d, various aspects of transmitting beacon signals, and receiving probing signals from stations and responding to such probing signals.

The transceivers 730 may include a modem configured to modulate the packets and provide the modulated packets to the antennas 740 for transmission, and to demodulate packets received from the antennas 740. The transceivers 730 may be implemented as one or more transmitters and one or more separate receivers. The transceivers 730 may be configured to communicate bi-directionally, via the antennas 740, with one or more associated stations. The AP 105-d may include multiple antennas 740. In some embodiments, the AP 105-d may support transmit antenna diversity (e.g., 2×2 diversity scheme, 3×3 diversity scheme), TX beamforming operations, and/or multi-user operations. The AP 105-d may communicate with a network 780 through the network communications module 770. In some instances, the network 780 may be part of a WLAN or Wi-Fi network. The AP 105-d may communicate with other network devices, such as the network devices 105-e and 105-f, using the network device communications module 760, the transceivers 730, and/or the network communications module 770.

According to the architecture of FIG. 7, the AP 105-d may further include a communications manager 750. The communications manager 750 may manage communications with stations (e.g., stations 115) and/or other network devices. The communications manager 750 may be in communication with some or all of the other components of the AP 105-d via the bus or buses 715. Alternatively, functionality of the communications manager 750 may be implemented as a component of the transceivers 730, as a computer program product, and/or as one or more controller elements of the processor 710.

Figure 8:
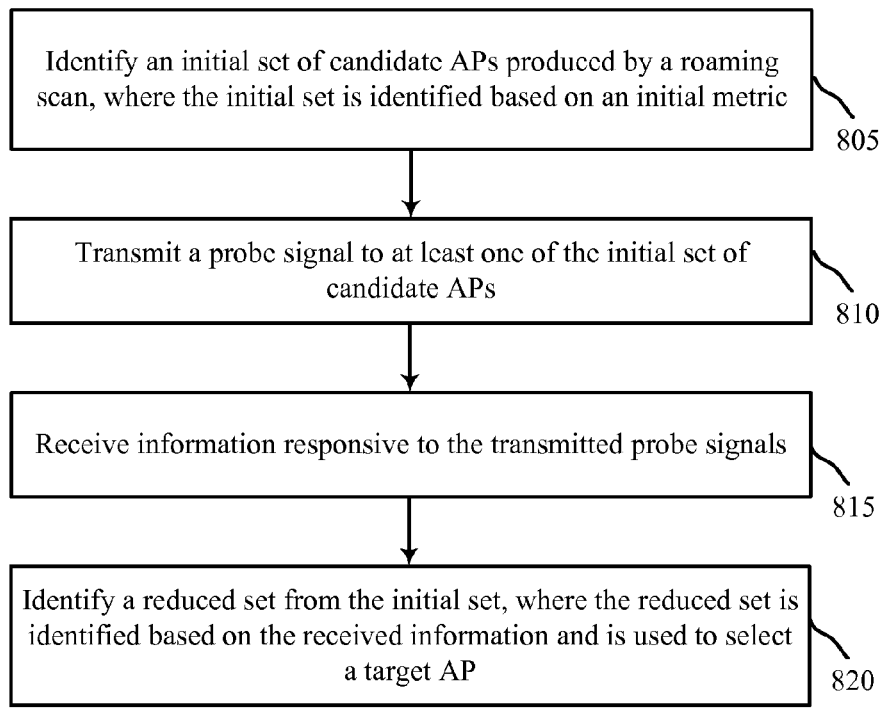
FIGS. 8-11 are flowcharts of examples of methods for a multidimensional algorithm for roaming (e.g., at a station) according to various embodiments.

FIG. 8 is a flow chart illustrating an example of a method 800 for wireless communications. For clarity, the method 800 is described below with reference to one of the stations, devices, and modules shown in FIGS. 1, 2A, 2B, 2C, 2D, 3, 5A, 5B, 5C, and/or 6. In one embodiment, one of the stations may execute one or more sets of codes to control the functional elements of the station to perform the functions described below.

At block 805, an initial set of candidate APs (e.g., initial set 230) produced by a roaming scan is identified. The initial set is identified based at least in part on an initial metric (e.g., beacon signal strength or BRSSI).

At block 810, a probe signal (e.g., probe signal 340) may be transmitted to at least one of the initial set of candidate APs.

At block 815, information is received (e.g., response signal 350) responsive to the transmitted probe signals.

At block 820, a reduced set (e.g., reduced set 240) is identified from the initial set, where the reduced set is identified based at least in part on the received information and is used to select a target AP.

In some embodiments of the method 800, at least one additional metric is identified and the probe signal is configured to obtain information corresponding to the at least one additional metric. The at least one additional metric may include one or more of a data throughput (e.g., maximum MCS), a power consumption rate, a data packet power level (e.g., SNR/RSSI), an acknowledgment (ACK) packet power level (e.g., SNR/RSSI), an AP range, a transmit diversity (e.g., 2×2, 3×3 diversity), a network loading (e.g., BSS load or back-off stalls) or loading history, a low-power feature (e.g., UAPSD), a transmit beamforming parameter, a multi-user MIMO parameter, a channel delay spread parameter, blocker presence/magnitude parameter, STBC/LDPC capability parameter, and an angle-of-arrival or AOA variation.

In some embodiments of the method 800, identifying the reduced set from the initial set includes identifying at least one additional metric based at least in part on the received information, and selecting candidate APs from the initial set for which the at least one additional metric is greater than a threshold value. In some embodiments, identifying the reduced set from the initial set includes identifying at least one additional metric based at least in part on the received information, and discarding candidate APs from the initial set for which the at least one additional metric is less than a threshold value. In some embodiments, identifying the reduced set from the initial set includes identifying additional metrics based at least in part on the received information, combining the additional metrics, and selecting candidate APs from the initial set for which the combined additional metrics are greater than a threshold value. Combining the additional metrics includes applying weighted factors to the additional metrics, and optimizing the weighted additional metrics with respect to one of the additional metrics.

In some embodiments of the method 800, the initial metric includes a beacon power level (e.g., BRSSI). A threshold value used with the initial metric may be adapted to identify the initial set. Moreover, the roaming scan may be triggered during an idle associated mode or an active traffic mode based at least in part on a metric different from the initial metric. For example, for the idle associated mode, power, and/or AP LOS range may be considered to trigger the roaming scan. For the active traffic mode, MCS or throughput, SNR/RSSI of ACK packet, and/or network loading (e.g., BSS loading) may be considered to trigger the roaming scan. In addition, the roaming scan may be triggered when the initial metric is greater than a threshold value (e.g., the BRSSI level is sufficient for a good connection) and at least one additional metric is less than a threshold value (e.g., PER level is too low).

Figure 9:
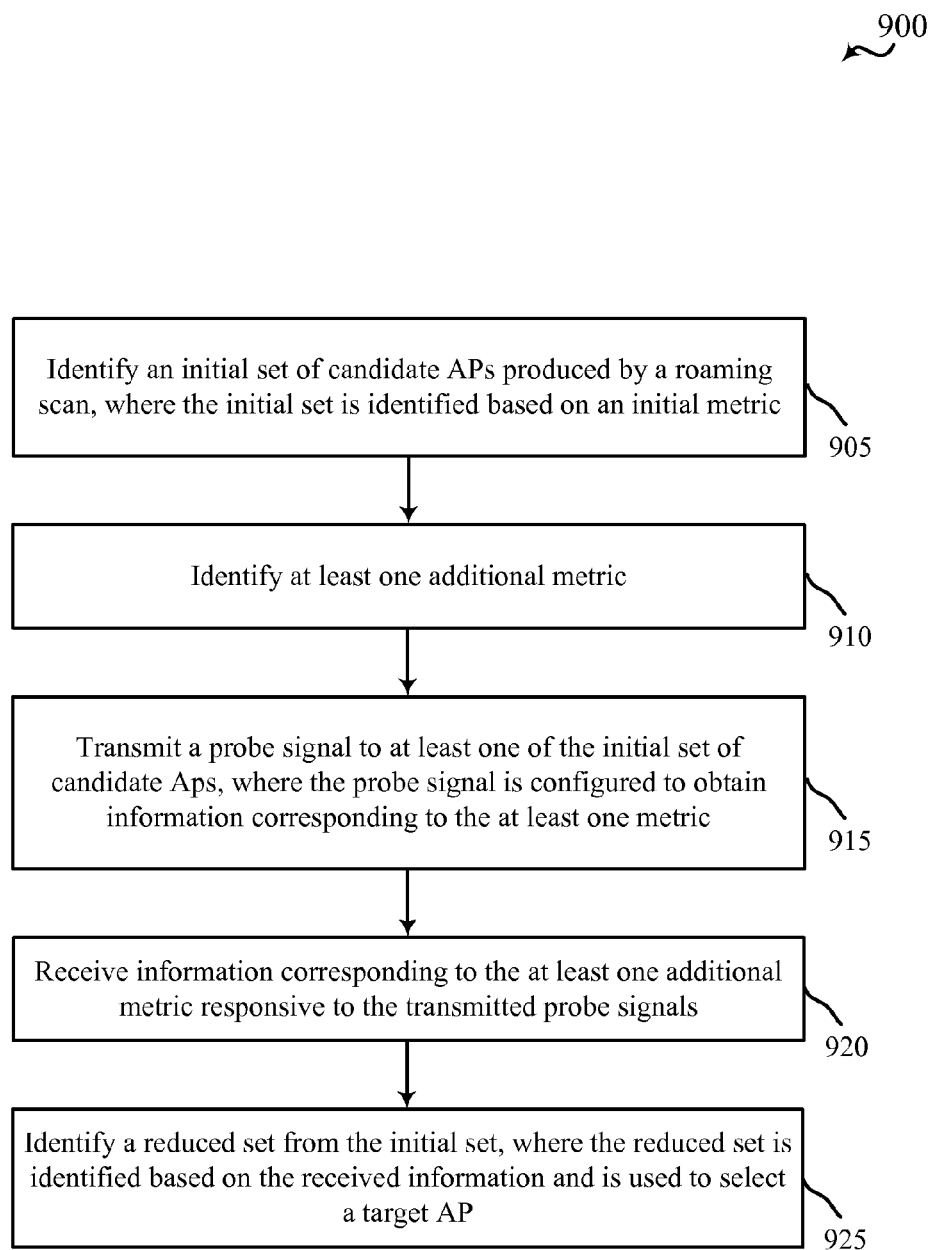

FIG. 9 is a flow chart illustrating an example of a method 900 for wireless communications. For clarity, the method 900 is described below with reference to one of the stations, devices, and modules shown in FIGS. 1, 2A, 2B, 2C, 2D, 3, 5A, 5B, 5C, and/or 6. In one embodiment, one of the stations may execute one or more sets of codes to control the functional elements of the station to perform the functions described below.

At block 905, an initial set of candidate APs (e.g., initial set 230) produced by a roaming scan is identified. The initial set is identified based at least in part on an initial metric (e.g., beacon signal strength or BRSSI).

At block 910, at least one additional metric is identified. Examples of such metrics include, but are not limited to, maximum throughput, lower power (including presence of certain low-power features like UAPSD and IEEE 802.11c suite of low-power features), SNR/RSSI of a data or ACK packet, shortest range to an AP (where shorter may be better), transmit chains or transmit diversity (where higher diversity may be better), BSS loading, TxBF or MU parameters, AoA variation, blocker presence/magnitude, channel delay spread parameter, and/or STBC/LDPC capability parameter.

At block 915, a probe signal (e.g., probe signal 340) may be transmitted to at least one of the initial set of candidate APs, where the probe signal is configured to obtain information corresponding to the at least one metric.

At block 920, information corresponding to the at least one metric is received (e.g., response signal 350) responsive to the transmitted probe signals.

At block 925, a reduced set (e.g., reduced set 240) is identified from the initial set, where the reduced set is identified based at least in part on the received information and is used to select a target AP.

Figure 10:
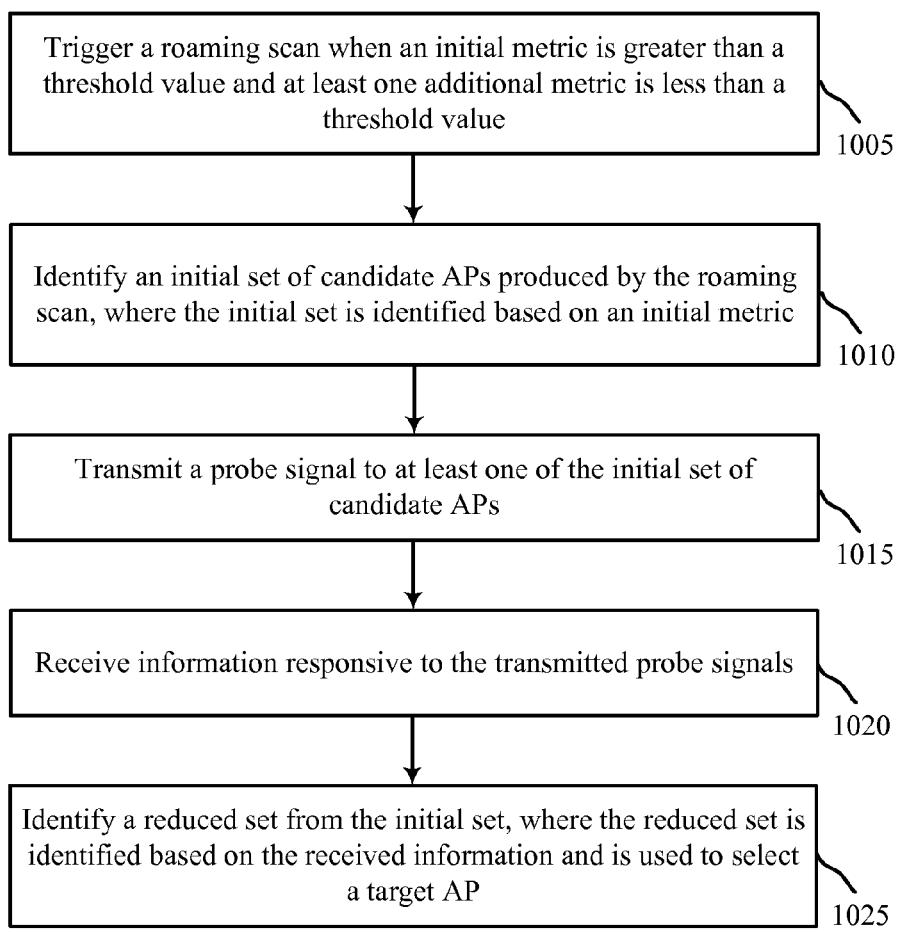

FIG. 10 is a flow chart illustrating an example of a method 1000 for wireless communications. For clarity, the method 1000 is described below with reference to one of the stations, devices, and modules shown in FIGS. 1, 2A, 2B, 2C, 2D, 3, 5A, 5B, 5C, and/or 6. In one embodiment, one of the stations may execute one or more sets of codes to control the functional elements of the station to perform the functions described below.

At block 1005, a roaming scan is triggered when an initial metric is greater than a threshold value (e.g., the BRSSI level is sufficient for a good connection) and at least one additional metric is less than a threshold value (e.g., PER level is too low).

At block 1010, an initial set of candidate APs (e.g., initial set 230) produced by the roaming scan is identified. The initial set is identified based at least in part on an initial metric (e.g., beacon signal strength or BRSSI).

At block 1015, a probe signal (e.g., probe signal 340) may be transmitted to at least one of the initial set of candidate APs.

At block 1020, information is received (e.g., response signal 350) responsive to the transmitted probe signals.

At block 1025, a reduced set (e.g., reduced set 240) is identified from the initial set, where the reduced set is identified based at least in part on the received information and is used to select a target AP.

Figure 11:
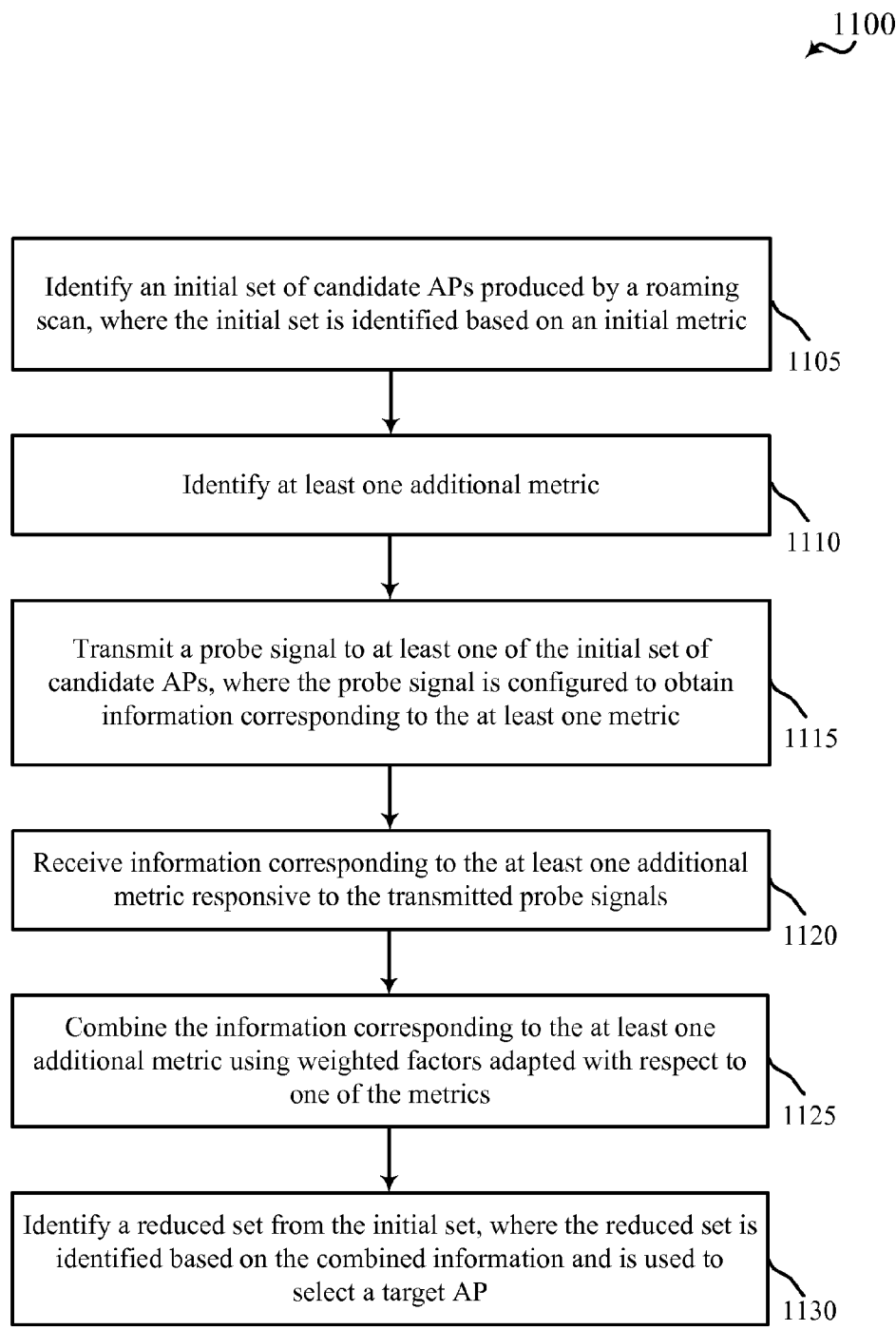

FIG. 11 is a flow chart illustrating an example of a method 1100 for wireless communications. For clarity, the method 1100 is described below with reference to one of the stations, devices, and modules shown in FIGS. 1, 2A, 2B, 2C, 2D, 3, 5A, 5B, 5C, and/or 6. In one embodiment, one of the stations may execute one or more sets of codes to control the functional elements of the station to perform the functions described below.

At block 1105, an initial set of candidate APs (e.g., initial set 230) produced by a roaming scan is identified. The initial set is identified based at least in part on an initial metric (e.g., beacon signal strength or BRSSI).

At block 1110, at least one additional metric is identified.

At block 1115, a probe signal (e.g., probe signal 340) may be transmitted to at least one of the initial set of candidate APs, where the probe signal is configured to obtain information corresponding to the at least one metric.

At block 1120, information corresponding to the at least one metric is received (e.g., response signal 350) responsive to the transmitted probe signals.

At block 1125, the information corresponding to the at least one metric is combined using weighted factors optimized with respect to one of the metrics.

At block 1130, a reduced set (e.g., reduced set 240) is identified from the initial set, where the reduced set is identified based at least in part on the combined information and is used to select a target AP.

Thus, the methods 800, 900, 1000, and 1100 may provide for wireless communications. It should be noted that each of the methods 800, 900, 1000, and 1100 is just one implementation and that the operations of the methods 800, 900, 1000, and 1100 may be rearranged or otherwise modified such that other implementations are possible. In some instances, the operations of two or more of the methods 800, 900, 1000, and 1100 may be combined to produce other implementations.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The term "optimize" used throughout this disclosure may mean to adapt in order to improve but not necessarily an attempt to create a completely optimal—e.g., most preferred—scenario. Thus, the disclosure is not to be limited to the examples and designs described herein but is to be accorded the widest scope consistent with the principles and novel features disclosed herein.

What is claimed is:

1. A method for wireless communications, comprising:
    identifying an initial set of candidate access points produced by a roaming scan, the initial set being identified based at least in part on an initial metric;
    identifying at least one additional metric;
    transmitting a probe signal to at least one of the initial set of candidate access points, wherein the probe signal is configured to obtain information corresponding to the at least one additional metric;
    receiving information responsive to the transmitted probe signals; and
    identifying a reduced set from the initial set, the reduced set being identified based at least in part on the received information and being used to select a target access point.

2. The method of claim 1, wherein the at least one additional metric is a member of the group consisting of:
    a data throughput;
    a power consumption rate;
    a data packet power level;
    an acknowledgment packet power level;
    an access point line of sight range;
    a transmit diversity;
    a network loading;
    a low-power feature;
    a transmit beamforming parameter;

a multi-user multiple-input multiple-output (MIMO) parameter;
a channel delay spread parameter;
a blocker presence and magnitude parameter;
a Space Time Block Coding (STBC) and/or Low-Density Parity-Check (LDPC) capability parameter; and
an angle-of-arrival variation.

3. The method of claim 1, wherein identifying the reduced set from the initial set comprises:
identifying the at least one additional metric based at least in part on the received information; and
at least one member from the group consisting of:
selecting candidate access points from the initial set for which the at least one additional metric is greater than a threshold value; and
discarding candidate access points from the initial set for which the at least one additional metric is less than a threshold value.

4. The method of claim 1, wherein identifying the reduced set from the initial set comprises:
identifying additional metrics based at least in part on the received information;
combining the additional metrics; and
selecting candidate access points from the initial set for which the combined additional metrics are greater than a threshold value.

5. The method of claim 4, wherein combining the additional metrics comprises:
applying weighted factors to the additional metrics; and
adapting the weighted additional metrics with respect to one of the additional metrics.

6. The method of claim 1, wherein the initial metric comprises a beacon power level.

7. The method of claim 1, further comprising triggering the roaming scan during an idle associated mode or an active traffic mode based at least in part on a metric different from the initial metric.

8. The method of claim 1, further comprising triggering the roaming scan when the initial metric is greater than a threshold value and at least one additional metric is less than a threshold value.

9. The method of claim 1, further comprising adapting a threshold value used with the initial metric to identify the initial set.

10. A communications device, comprising:
a roaming module configured to identify an initial set of candidate access points produced by a roaming scan, the initial set being identified based at least in part on an initial metric, and identify at least one additional metric;
a transmitter configured to transmit a probe signal to at least one of the initial set of candidate access points, wherein the probe signal is configured to obtain information corresponding to the at least one additional metric; and
a receiver configured to receive information responsive to the transmitted probe signals, wherein the roaming module is further configured to identify a reduced set from the initial set based at least in part on the received information and to use to the reduced set to select a target access point.

11. The communications device of claim 10, wherein the at least one additional metric is a member of the group consisting of:
a data throughput;
a power consumption rate;
a data packet power level;
an acknowledgment packet power level;
an access point line of sight range;
a transmit diversity;
a network loading;
a low-power feature;
a transmit beamforming parameter;
a multi-user multiple-input multiple-output (MIMO) parameter;
a channel delay spread parameter;
a blocker presence and magnitude parameter;
a Space Time Block Coding (STBC) and/or Low-Density Parity-Check (LDPC) capability parameter; and
an angle-of-arrival variation.

12. The communications device of claim 10, wherein the roaming module is configured to identify the reduced set from the initial set by being configured to:
identify the at least one additional metric based at least in part on the received information; and
select candidate access points from the initial set for which the at least one additional metric is greater than a threshold value.

13. The communications device of claim 10, wherein the roaming module is configured to identify the reduced set from the initial set by being configured to:
identify additional metrics based at least in part on the received information;
combine the additional metrics; and
select candidate access points from the initial set for which the combined additional metrics are greater than a threshold value.

14. The communications device of claim 13, wherein the roaming module is configured to combine the additional metrics by being configured to:
apply weighted factors to the additional metrics; and
adapt the weighted additional metrics with respect to one of the additional metrics.

15. The communications device of claim 10, wherein the initial metric comprises a beacon power level.

16. The communications device of claim 10, wherein the roaming module is further configured to perform at least one from a group consisting of:
trigger the roaming scan during an idle associated mode or an active traffic mode based at least in part a metric different from the initial metric; and
trigger the roaming scan when the initial metric is greater than a threshold value and at least one additional metric is less than a threshold value.

17. A communications device, comprising:
means for identifying an initial set of candidate access points produced by a roaming scan, the initial set being identified based at least in part on an initial metric;
means for identifying at least one additional metric;
means for transmitting a probe signal to at least one of the initial set of candidate access points, wherein the probe signal is configured to obtain information corresponding to the at least one additional metric;
means for receiving information responsive to the transmitted probe signals; and
means for identifying a reduced set from the initial set, the reduced set being identified based at least in part on the received information and being used to select a target access point.

18. The communications device of claim 17, further comprising means for triggering the roaming scan when the initial metric is greater than a threshold value and at least one additional metric is less than a threshold value.

19. The communications device of claim 17, wherein the at least one additional metric is a member of the group consisting of:
- a data throughput;
- a power consumption rate;
- a data packet power level;
- an acknowledgment packet power level;
- an access point line of sight range;
- a transmit diversity;
- a network loading;
- a low-power feature;
- a transmit beamforming parameter;
- a multi-user multiple-input multiple-output (MIMO) parameter;
- a channel delay spread parameter;
- a blocker presence and magnitude parameter;
- a Space Time Block Coding (STBC) and/or Low-Density Parity-Check (LDPC) capability parameter; and
- an angle-of-arrival variation.

20. The communications device of claim 17, wherein the means for identifying the reduced set from the initial set comprises:
- means for identifying the at least one additional metric based at least in part on the received information; and
- means for selecting candidate access points from the initial set for which the at least one additional metric is greater than a threshold value.

21. The communications device of claim 17, wherein the means for identifying the reduced set from the initial set comprises:
- means for identifying additional metrics based at least in part on the received information;
- means for combining the additional metrics; and
- means for selecting candidate access points from the initial set for which the combined additional metrics are greater than a threshold value.

22. The communications device of claim 21, wherein the means for combining the additional metrics comprises:
- means for applying weighted factors to the additional metrics; and
- means for optimizing the weighted additional metrics with respect to one of the additional metrics.

23. The communications device of claim 17, wherein the initial metric comprises a beacon power level.

24. The communications device of claim 17, further comprising means for triggering the roaming scan during an idle associated mode or an active traffic mode based at least in part on a metric different from the initial metric.

25. A non-transitory computer-readable medium comprising:
- code for causing a communications device to identify an initial set of candidate access points produced by a roaming scan, the initial set being identified based at least in part on an initial metric;
- code for causing the communications device to identify at least one additional metric;
- code for causing the communications device to transmit a probe signal to at least one of the initial set of candidate access points, wherein the probe signal is configured to obtain information corresponding to the at least one additional metric;
- code for causing the communications device to receive information responsive to the transmitted probe signals; and
- code for causing the communications device to identify a reduced set from the initial set, the reduced set being identified based at least in part on the received information and being used to select a target access point.

26. The computer program product of claim 25, wherein the non-transitory computer-readable medium further comprises at least one member from the group consisting of:
- code for causing the communications device to trigger the roaming scan during an idle associated mode or an active traffic mode based at least in part on a metric different from the initial metric; and
- code for causing the communications device to trigger the roaming scan when the initial metric is greater than a threshold value and at least one additional metric is less than a threshold value.

27. The computer program product of claim 25, wherein the at least one additional metric is a member of the group consisting of:
- a data throughput;
- a power consumption rate;
- a data packet power level;
- an acknowledgment packet power level;
- an access point line of sight range;
- a transmit diversity;
- a network loading;
- a low-power feature;
- a transmit beamforming parameter;
- a multi-user multiple-input multiple-output (MIMO) parameter;
- a channel delay spread parameter;
- a blocker presence and magnitude parameter;
- a Space Time Block Coding (STBC) and/or Low-Density Parity-Check (LDPC) capability parameter; and
- an angle-of-arrival variation.

28. The computer program product of claim 25, wherein the code for causing the communications device to identify the reduced set from the initial set comprises:
- code for causing the communications device to identify the at least one additional metric based at least in part on the received information; and
- at least one member from the group consisting of:
  - code for causing the communications device to select candidate access points from the initial set for which the at least one additional metric is greater than a threshold value; and
  - code for causing the communications device to combine the additional metrics and to select candidate access points from the initial set for which the combined additional metrics are greater than a threshold value.

29. The computer program product of claim 28, wherein the code for causing the communications device to combine the additional metrics comprises:
- code for causing the communications device to apply weighted factors to the additional metrics; and
- code for causing the communications device to adapt the weighted additional metrics with respect to one of the additional metrics.

* * * * *